US010349023B2

(12) United States Patent
Kaji

(10) Patent No.: US 10,349,023 B2
(45) Date of Patent: Jul. 9, 2019

(54) IMAGE PROCESSING APPARATUS AND METHOD

(71) Applicant: SONY CORPORATION, Tokyo (JP)

(72) Inventor: Yohsuke Kaji, Chiba (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/308,741

(22) PCT Filed: Jun. 17, 2015

(86) PCT No.: PCT/JP2015/067422
§ 371 (c)(1),
(2) Date: Nov. 3, 2016

(87) PCT Pub. No.: WO2016/002510
PCT Pub. Date: Jan. 7, 2016

(65) Prior Publication Data
US 2017/0142381 A1 May 18, 2017

(30) Foreign Application Priority Data
Jul. 1, 2014 (JP) .................. 2014-135790

(51) Int. Cl.
G06T 7/70 (2017.01)
G06K 9/32 (2006.01)
(Continued)

(52) U.S. Cl.
CPC ............. H04N 9/3185 (2013.01); G06K 9/32 (2013.01); G06K 9/4604 (2013.01); G06K 9/52 (2013.01);
(Continued)

(58) Field of Classification Search
CPC ........... G06T 7/70; G06K 9/32; G06K 9/4604
(Continued)

(56) References Cited

U.S. PATENT DOCUMENTS

| 6,754,370 B1* | 6/2004 | Hall-Holt | G01B 11/25 356/3 |
| 2004/0151365 A1* | 8/2004 | An Chang | G06K 9/2036 382/154 |
| 2014/0063192 A1* | 3/2014 | Sonoda | G01B 11/2513 348/46 |

FOREIGN PATENT DOCUMENTS

| JP | 04-181106 | 6/1992 |
| JP | 2005-252804 | 9/2005 |
| JP | 2009-070061 | 4/2007 |

OTHER PUBLICATIONS

Ramesh Raskar, et al., iLamps: Geometrically Aware and Self-Configuring Projectors, Mitsubishi Electric Research Labs (MERL), ACM SIGGRAPH 2003 Conference Proceedings, pp. 1-10.
(Continued)

Primary Examiner — Jeffery A Williams
(74) Attorney, Agent, or Firm — Paratus Law Group, PLLC

(57) ABSTRACT

The present technology relates to an image processing apparatus and method for enabling a relative posture between a projection unit and a shooting unit to be found more easily. According to one aspect of the present technology, a correspondence between a projection image and its shot image is detected by use of a pattern shot image which is a shot image of a pattern projection image as a projection image of an image including a pattern. The present technology can be applied to an electronic device including a projector or camera or the functions of both, a computer for controlling the same, and the like.

22 Claims, 31 Drawing Sheets

(51) Int. Cl.
   *G06K 9/46*      (2006.01)
   *H04N 9/31*      (2006.01)
   *G06K 9/52*      (2006.01)
   *G06K 9/62*      (2006.01)
(52) U.S. Cl.
   CPC .............. *G06K 9/6201* (2013.01); *G06T 7/70* (2017.01); *H04N 9/3147* (2013.01); *H04N 9/3194* (2013.01)
(58) Field of Classification Search
   USPC ....................................................... 348/136
   See application file for complete search history.

(56) References Cited

OTHER PUBLICATIONS

Jan. 3, 2019, Chinese Office Action issued for related CN Application No. 201580027226.3.

\* cited by examiner

IMAGE PROCESSING APPARATUS AND METHOD

CROSS REFERENCE TO PRIOR APPLICATION

This application is a National Stage Patent Application of PCT International Patent Application No. PCT/JP2015/067422 (filed on Jun. 17, 2015) under 35 U.S.C. § 371, which claims priority to Japanese Patent Application No. 2014-135790 (filed on Jul. 1, 2014), which are all hereby incorporated by reference in their entirety.

TECHNICAL FIELD

The present technology relates to an image processing apparatus and method, and particularly to an image processing apparatus and method for enabling a relative posture between a projection unit and a shooting unit to be more easily found.

BACKGROUND ART

Conventionally, there is a method for projecting one image such that some or all of the projection images projected from a plurality of projectors mutually overlap. In such a part where projection images overlap (which will be denoted as overlap region), its luminance can be different from that in other region or the overlapping projection images can be offset.

Therefore, there has been assumed that such an overlap region is sensed by a camera to detect how the overlap is and an image to be projected is corrected depending on the detection result. In this case, it is necessary to grasp the correspondences of pixels between a projector for projecting an image and a camera for shooting its projection image.

A method using gray code has been considered as a method for acquiring the correspondences of pixels. With the method, however, many pattern images need to be used for discriminating each pixel of the projector, and thus the processing of grasping the correspondences of pixels can be complicated.

Thus, there has been proposed a method for projecting a checker and four patterns in which any of the four corners of the checker is missing and matching the order of projection of the patterns with the information on the missing corners thereby to detect a correspondence between each corner of the checker and a pixel of the projector (see Non-Patent Document 1, for example).

CITATION LIST

Non-Patent Document

Non-Patent Document 1: Ramesh Raskar, Jeroen van Baar, Paul Beardsley, Thomas Willwacher, Srinivas Rao, Clifton Forlines, "iLamps: Geometrically Aware and Self-Configuring Projectors", ACM SIGGRAPH 2003 Conference Proceedings

SUMMARY OF THE INVENTION

Problems to be Solved by the Invention

However, methods other than the above methods have been desired.

The present technology is proposed in terms of the above situations, and it is an object thereof to enable a relative posture between a projection unit and a shooting unit to be more easily found.

Solutions to Problems

One aspect of the present technology is an image processing apparatus including: a detection unit for detecting a correspondence between a projection image and a shot image of the projection image by use of a pattern shot image which is a shot image of a pattern projection image as a projection image of an image including a pattern.

The image may include a plurality of patterns, and each pattern may be configured of a plurality of sub-patterns and may be different from other patterns in the number of sub-patterns or positional relationships between the sub-patterns.

The pattern may have: a start coder in which the sub-patterns are arranged in common number and positional relationship in each pattern; and a unique code in which the number or positional relationship of the sub-patterns is different from other patterns.

The start code may be configured of a plurality of sub-patterns arranged as a graphic, and the unique code may be arranged in a different graphic from other patterns.

The start code may be configured of three patterns arranged in one row by three columns, and the unique code may be configured of a single or a plurality of sub-patterns arranged in different number or positional relationship from the other patterns within two rows by three columns.

The sub-patterns may be arranged in a dotted graphic.

The detection unit may detect corresponding points between a projection image and a shot image of the projection image by use of the number and positional relationship of the sub-patterns for each pattern included in the pattern shot image, thereby detecting the correspondence.

The detection unit may analyze the number and positional relationship of the sub-patterns by use of the adjacency relationships between the patterns for each pattern, thereby detecting the corresponding points.

The detection unit may detect an adjacency relationship between the sub-patterns by use of an edge image indicating edges of a pattern in a shot image of a projection image of an image with the predetermined pattern.

An edge detection unit for detecting edges of the pattern in the shot image of the projection image of the image with the predetermined pattern thereby to generate the edge image may be further included, and the detection unit may detect an adjacency relationship between the sub-patterns by use of the edge image generated by the edge detection unit.

The detection unit may detect an adjacency relationship between the sub-patterns by use of the edge-expanded edge image.

The detection unit may detect an adjacency relationship between the sub-patterns by use of the centers of gravity of the sub-patterns for each pattern included in the pattern shot image.

The detection unit may detect the centers of gravity of the sub-patterns by use of the binarized pattern shot image.

The detection unit may detect corresponding points between the projection image and the shot image by use of corresponding points between a homography image generated on the basis of the patterns included in the pattern shot image and a shot image of the projection image.

The image with the predetermined pattern may be a checked image.

The detection unit may detect corresponding points between the homography image and the shot image for all the corners of the predetermined pattern in the shot image, and may detect corresponding points between the projection image and the shot image for all the detected corners of the predetermined pattern.

The detection unit may detect the corners by use of an image in which the shot image is binarized to expand a predetermined component.

A shooting unit for shooting a projection image and acquiring a shot image may be further included, and the detection unit may detect corresponding points between a projection image and the shot image acquired by shooting the projection image by the shooting unit by use of the pattern shot image acquired by shooting the pattern projection image by the shooting unit, thereby detecting the correspondence.

A projection unit for projecting an image may be further included, and the detection unit may detect corresponding points between a projection image projected by the projection unit and a shot image of the projection image by use of a pattern shot image as a shot image of the pattern projection image projected by the projection unit, thereby detecting the correspondence.

An image processing unit for performing an image processing on a part of an image to be projected, which overlaps on other projection image, by use of the correspondence between the projection image and the shot image detected by the detection unit may be further included.

Further, One aspect of the present technology is an image processing method for detecting a correspondence between a projection image and a shot image of the projection image by use of a pattern shot image which is a shot image of a pattern projection image as a projection image of an image including a pattern.

According to one aspect of the present technology, a correspondence between a projection image and its shot image is detected by use of a pattern shot image which is a shot image of a pattern projection image as a projection image of an image including a pattern.

EFFECTS OF THE INVENTION

According to the present technology, it is possible to process information on the basis of images. Further, according to the present technology, it is possible to more easily find a relative posture between a projection unit and a shooting unit.

MODE FOR CARRYING OUT THE INVENTION

A mode for carrying out the present disclosure (which will be denoted as exemplary embodiment below) will be described below. Additionally, the description will be made in the following order.

1. First Exemplary Embodiment (projection shooing system)

<1. First Exemplary Embodiment>
<Overlap Region and Correction>

Conventionally, there has been a method for projecting one image by use of a plurality of projectors. By doing so, for example, it is possible to increase the image size of a projection image without reducing the resolution or it is possible to project a projection image on a curve with less distortion.

In this case, the projection images projected from each projector are difficult to arrange without offset, and thus generally the projection is made such that some or all of the projection images overlap. That is, in this case, a part where a plurality of projection images overlap (which is also denoted as overlap region) is caused.

Figure 1:
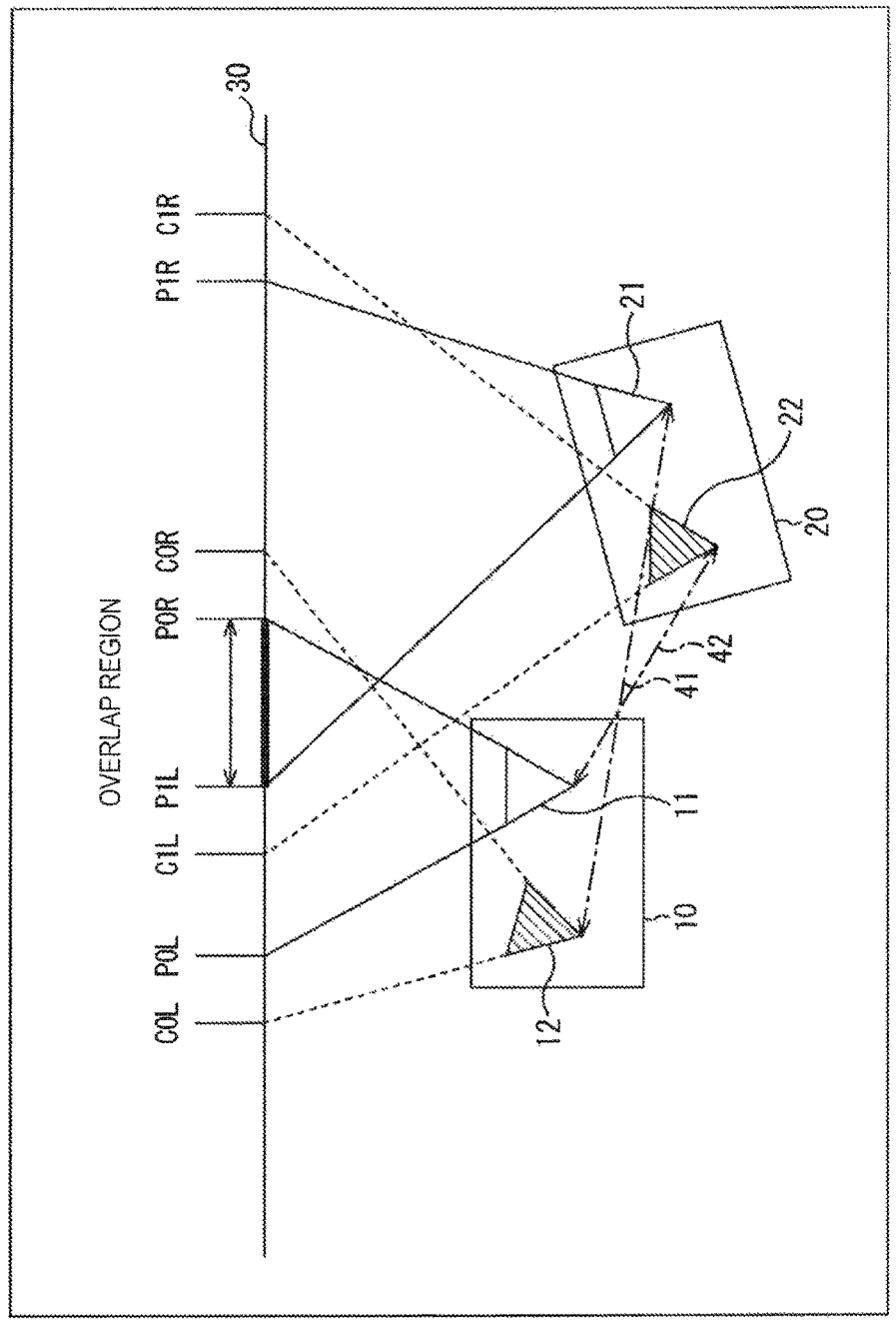
FIG. 1 is a diagram for explaining exemplary overlap regions.

For example, as illustrated in FIG. 1, when a projection unit 11 in a projection shooting device 10 projects an image toward a screen 30, the image is assumed to be projected in a range of P0L to P0R of the screen 30. Similarly, when a projection unit 21 in a projection shooting device 20 projects an image toward the screen 30, the image is assumed to be projected in a range of P1L to P1R of the screen 30. In this case, the range of P1L to P0R of the screen 30 is assumed as overlap region.

In such an overlap region, for example, the luminance can be different from that of other region or an offset can be caused in the overlapping projection images, and thus level correction, distortion correction, or the like is required to make.

For example, if the projection unit 11 and the projection unit 21 project an image at uniform luminance in each entire projection range, the overlap region is projected with the images from both the projection unit 11 and the projection unit 21, and thus it is brighter than other ranges (the range of P0L to P1L and the range of P0R to P1R). When one image is projected in the range of P0L to P1L, only the overlap region is bright, and the projection image can give a feeling of strangeness (or the image quality of the projection image deteriorates). Therefore, in such a case, level correction is required for restricting a reduction in image quality.

Further, a plurality of projection images overlap in an overlap region, and thus if a distortion is caused in a projection image, the projection images are difficult to align and the projection images can give a feeling of strangeness (or the image quality of the projection images can deteriorate). Therefore, in this case, distortion correction is required for restricting a reduction in image quality.

<Detection of Overlap Region>

Therefore, it has been assumed that such an overlap region is sensed by a camera or the like thereby to detect how the overlap is, and an image to be projected is corrected depending on the detection result. This is the same as to estimate a relative posture (rotational component or translational component) between a projector and a camera.

For example, as in the example of FIG. 1, it is assumed that the projection shooting device 10 has a projection function (the projection unit 11) of projecting an image and a shooting function (a shooting unit 12) of shooting a subject and acquiring a shot image. Similarly, it is assumed that the projection shooting device 20 has a projection function (the projection unit 21) of projecting an image and a shooting function (a shooting unit 22) of shooting a subject and acquiring a shot image. The shooting unit 12 shoots a range of C0L to C0R of the screen 30, and the shooting unit 22 shoots a range of C1L to C1R of the screen 30. That is, the shooting unit 12 can shoot a range of P1L to C0R of a projection image projected by the projection unit 21. Further, the shooting unit 22 can shoot a range of C1L to P0R of a projection image projected by the projection unit 11.

In this case, in each projection shooting device, if a positional relationship between the projection unit and the shooting unit is known, when a relative posture (double-headed arrow 41) between the shooting unit 12 and the projection unit 21 and a relative posture (double-headed arrow 42) between the shooting unit 22 and the projection unit 11 can be grasped, an overlap region can be detected.

Figure 2:
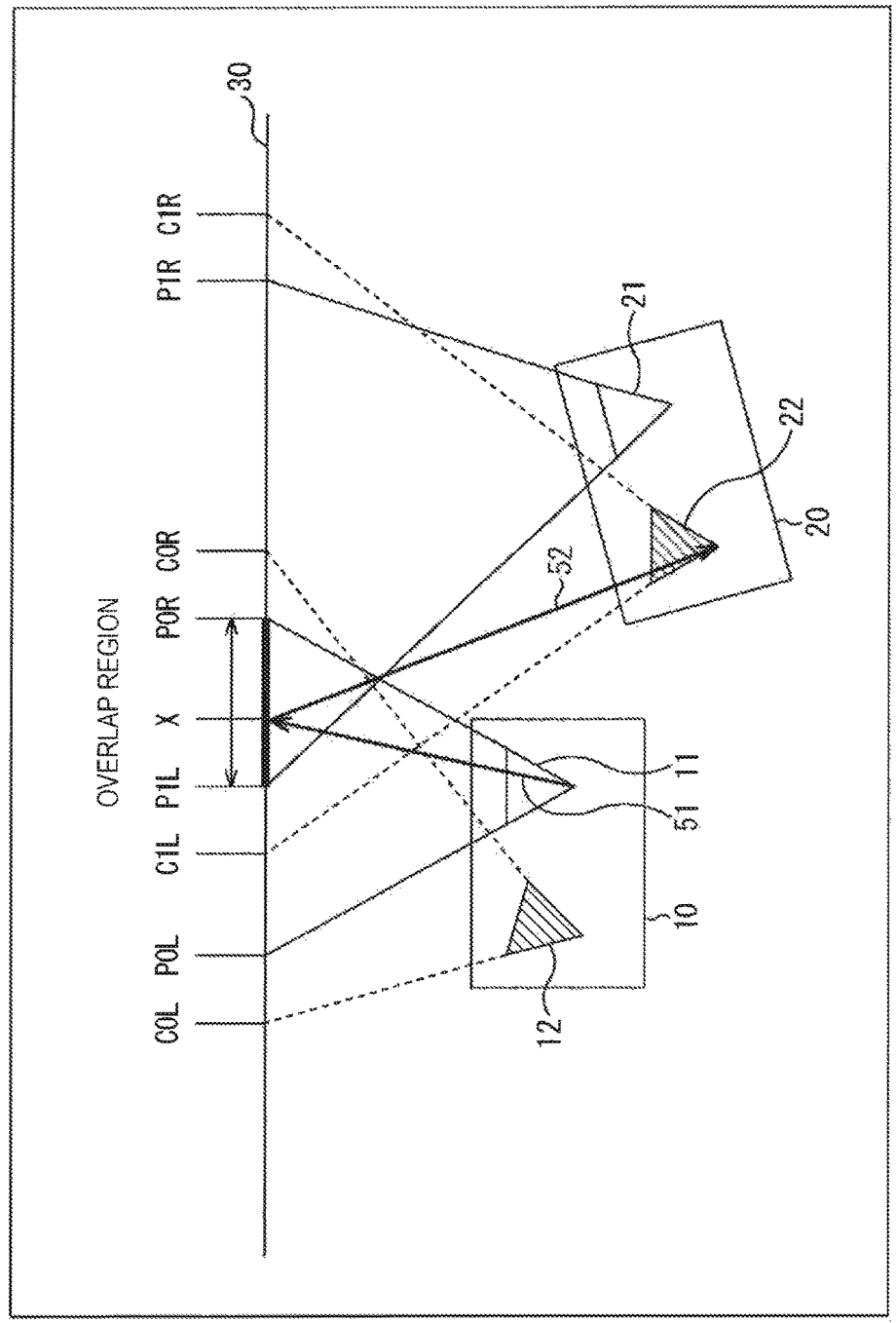
FIG. 2 is a diagram for explaining exemplary correspondences of pixels.

In other words, the correspondences of pixels between the projection unit and the shooting unit have only to be grasped. For example, as illustrated in FIG. 2, it is assumed that a light (arrow 51) emitted from the projection unit 11 reflects at X on the screen 30 and is received by the shooting unit 22 (arrow 52). If the correspondences between the pixels of the projection unit which emits the light and the pixels of the shooting unit which receives the light (or the pixels of the projection unit to which the pixels of the shooting unit correspond) can be grasped, an overlap region can be detected.

Figure 3:
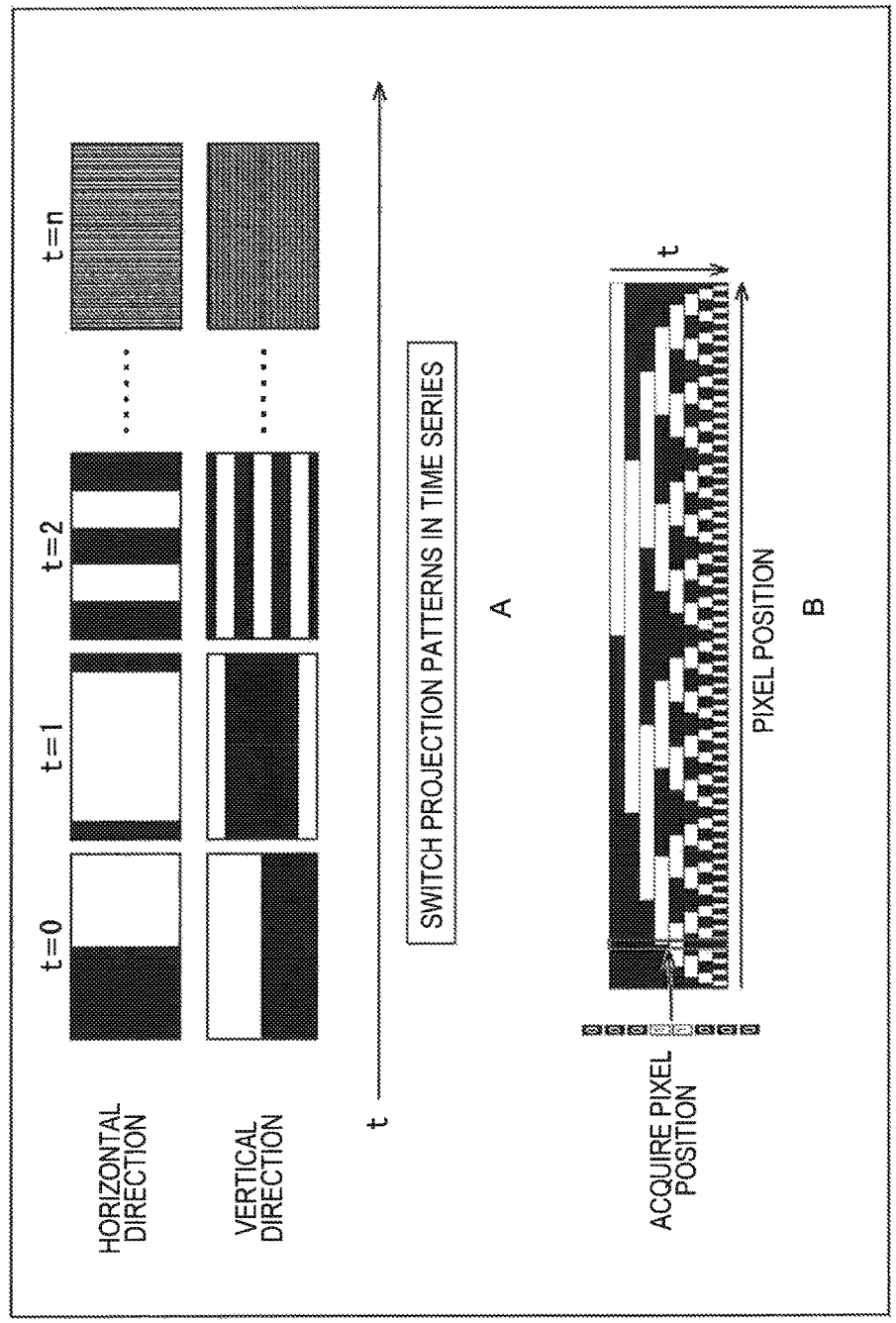
FIG. 3 is a diagram for explaining an exemplary method using gray code.

There has been described a method using gray code as a method for acquiring the correspondences of pixels between the projection unit (projector) and the shooting unit (camera). With the method, for example, predetermined pattern images as illustrated in A of FIG. 3 are projected from the projector while being changed in time series, and each pattern is shot by the camera. Then, when all the patterns are completely shot, 1 (white) or 0 (black) of each shooting pattern is detected at each pixel of the camera and the pattern of 1 and 0 is decoded as illustrated in B of FIG. 3 thereby to acquire the positions of the projector pixels. Thereby, the correspondences of pixels can be acquired.

However, the method using gray code needs to project and shoot as many pattern images as ceil (log 2 (horizontal resolution))+ceil (log 2 (vertical resolution)) for discriminating each pixel of the projector. Therefore, the complicated work is required and the processing time can increase. Further, when the angle of view of the camera is sufficiently wider than the angle of view of the projector, a plurality of pixels of the projector are assigned to one pixel of the camera, and thus the corresponding points are difficult to find with high accuracy.

Figure 4:
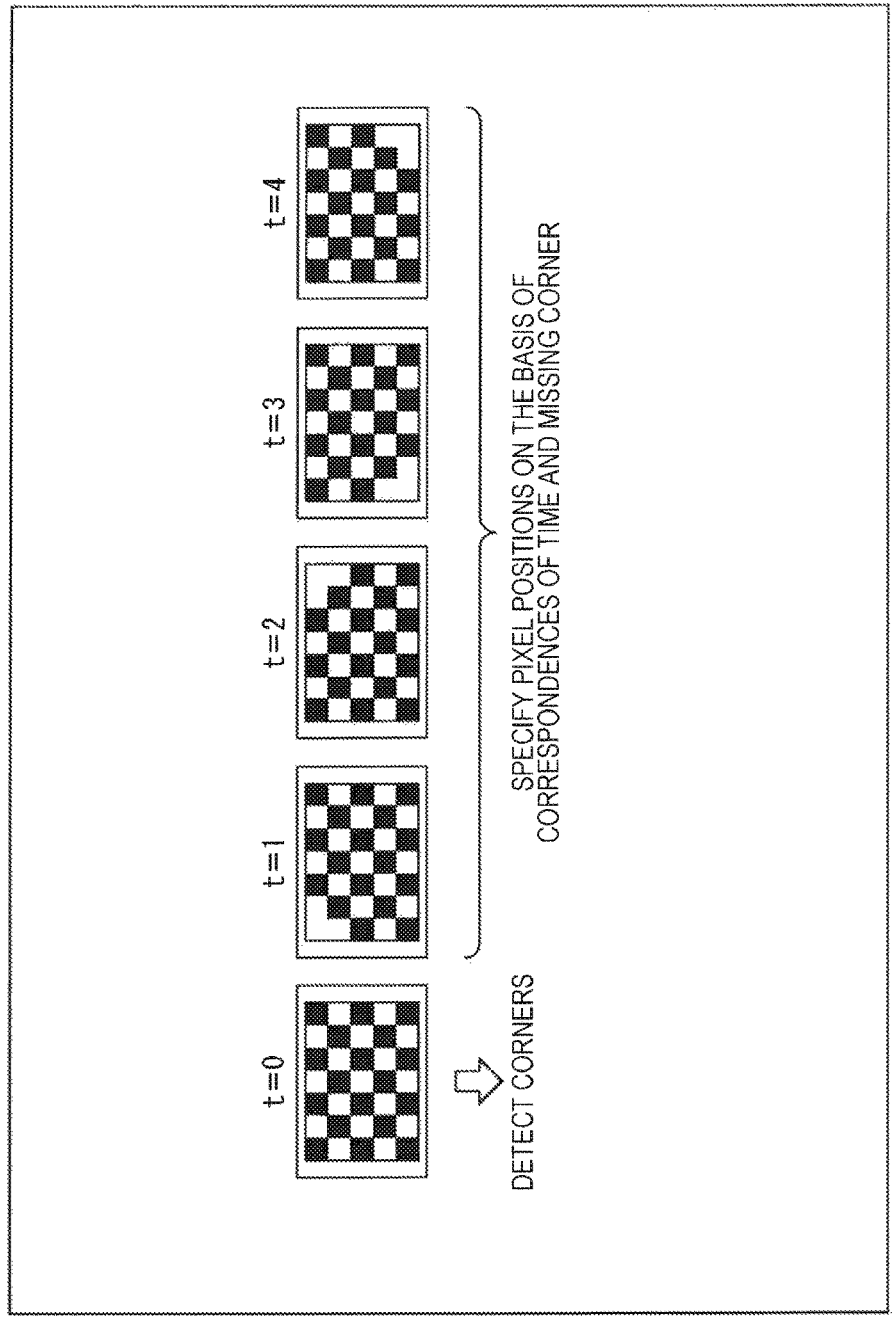
FIG. 4 is a diagram for explaining an exemplary method using checker pattern.

Thus, Non-Patent Document 1 proposes a method for projecting a checker and four patterns in which any of the four corners of the checker is missing and matching the order of projection of the patterns with the information on the missing corners thereby to detect which pixel of the projector each corner of the checker corresponds to as illustrated in FIG. 4.

With the method, the number of pattern images to be projected and shot can be remarkably reduced as compared with the method using gray code. With the method, however, five pattern images to be projected and shot are required, and the number is not the least. Further, with the method, at least one missing corner needs to be seen from the camera, and an impossible case may be assumed. Further, with a system for directly detecting a characteristic point from a shot image, robustness of the detection of a characteristic point cannot be sufficient for the background color of the screen or the situations of external lights.

As described above, methods for grasping correspondences of pixels between a projection unit and a shooting unit have been desired other than the above two methods.

<Detection of Corresponding Points>

Thus, a correspondence between a projection image and a shot image of the projection image is detected by use of a pattern shot image which is a shot image of a pattern projection image as a projection image of an image including a pattern.

A position of the image can be more accurately specified by the pattern, and thus corresponding points can be detected without an increase in the number of pattern images. That is, a relative posture between the projection unit and the shooting unit can be more easily found.

For example, there may be configured such that an image includes a plurality of patterns, each pattern is configured of a plurality of sub-patterns, and the number of sub-patterns or positional relationships between the sub-patterns are different from other patterns.

Further, a pattern may have a start code in which sub-patterns are arranged in common number or common relationship in each pattern and a unique code in which the number or positional relationships of sub-patterns are different from other patterns.

Further, the start code may be configured of a plurality of sub-patterns arranged as graphic and the unique code may be a different arrangement from other pattern as graphic.

Furthermore, the start code may be configured of three patterns arranged in one row by three columns, and the unique code may be configured of a single or a plurality of sub-patterns which are arranged in different number or positional relationship from other patterns within two rows by three columns.

The sub-patterns may be arranged as dotted graphic.

A detection unit may detect corresponding points between a projection image and a shot image of the projection image by use of the number and positional relationships of the sub-patterns of each pattern included in a pattern shot image, thereby detecting the correspondence.

Further, the detection unit may analyze the number and positional relationships of sub-patterns by use of the adjacency relationships between the patterns for each pattern, thereby detecting corresponding points.

At this time, the detection unit may detect the adjacency relationships between sub-patterns by use of an edge image indicating edges of a pattern in a shot image of a projection image of an image with the predetermined pattern.

Additionally, there may be further provided an edge detection unit for detecting edges of a pattern in a shot image of a projection image of an image with a predetermined pattern thereby to generate an edge image, and the detection unit may detect the adjacency relationships between the sub-patterns by use of the edge image generated by the edge detection unit.

At this time, the detection unit may detect the adjacency relationships between the sub-patterns by use of an edge-expanded edge image.

The detection unit may detect the adjacency relationships between the sub-patterns by use of the centers of gravity of the sub-patterns for each pattern included in the pattern shot image.

Further, the detection unit may detect the center of gravity of a sub-pattern by use of a binarized pattern shot image.

The detection unit may detect corresponding points between a projection image and its shot image by use of corresponding points between a homography image generated on the basis of the pattern included in the pattern shot image and a shot image of the projection image.

Additionally, an image with a predetermined pattern may be a checked image.

The detection unit may detect corresponding points between a homography image and a shot image for all the corners of the predetermined pattern of the shot image, and may detect corresponding points between the projection image and the shot image for all the detected corners of the predetermined pattern.

The detection unit may detect a corner by use of a binarized shot image with expanded predetermined component.

There may be further provided a shooting unit for shooting a projection image and acquiring a shot image, and the detection unit may detect corresponding points between a projection image and a shot image acquired by shooting the projection image by the shooting unit by use of a pattern shot image acquired by shooting a pattern projection image by the shooting unit, thereby detecting the correspondence.

There may be further provided a projection unit for projecting an image, and the detection unit may detect corresponding points between a projection image projected by the projection unit and a shot image of the projection image by use of a pattern shot image as a shot image of a pattern projection image projected by the projection unit, thereby detecting the correspondence.

There may be further provided an image processing unit for performing an image processing on a part of an image to be projected, which overlaps on other projection image, by use of the correspondence between the projection image and the shot image detected by the detection unit.

<Projection Shooting System>

Figure 5:
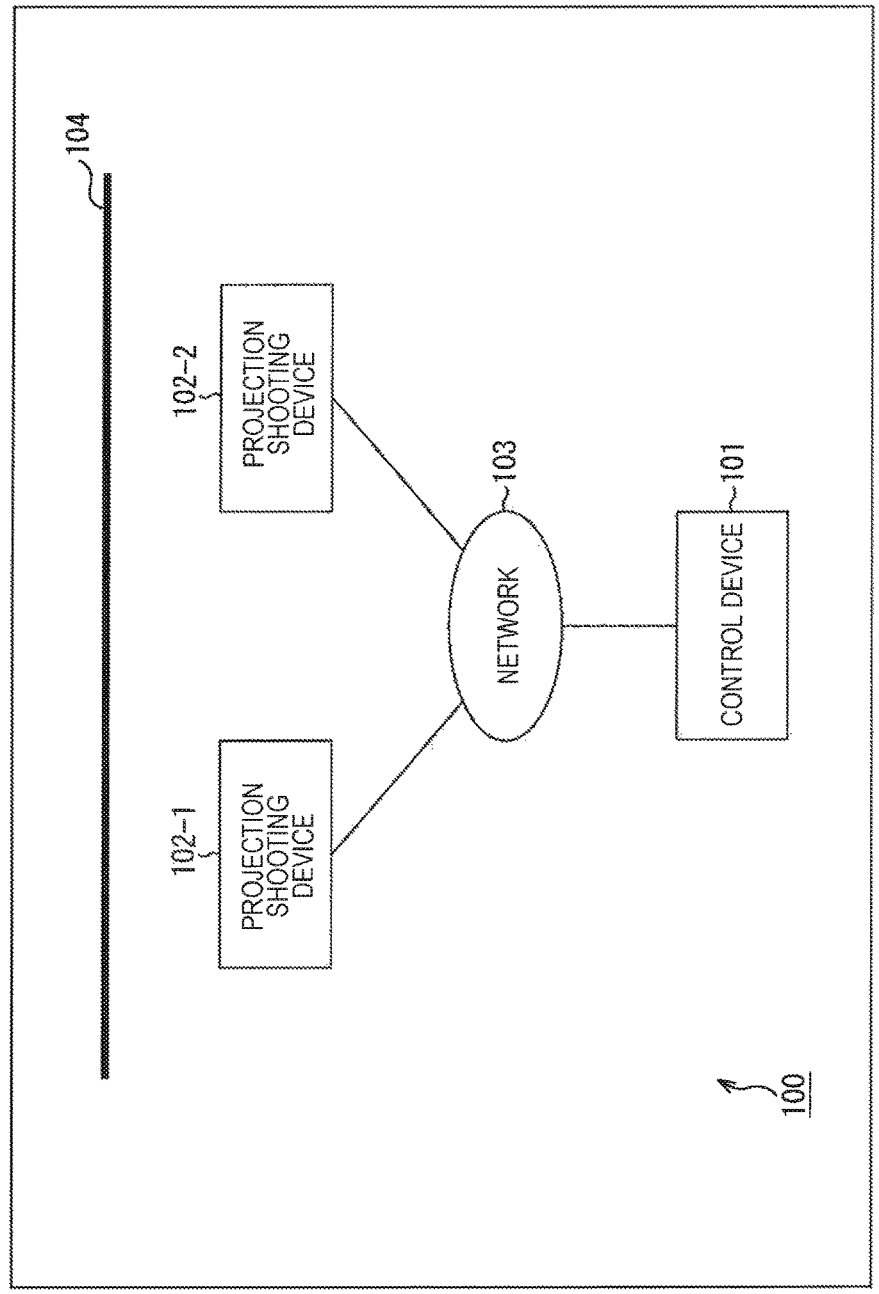
FIG. 5 is a diagram illustrating exemplary main components of a projection shooting system.

Exemplary main components of a projection shooting system to which a control device according to one exemplary embodiment of the image processing apparatus according to the present technology is applied are illustrated in FIG. 5. A projection shooting system 100 illustrated in FIG. 5 is directed for projecting an image. The projection shooting system 100 can project one image by use of a plurality of projection devices (projection shooting devices) as described above, for example. As illustrated in FIG. 5, the projection shooting system 100 has a control device 101, projection shooting devices 102-1 and 102-2, and a network 103.

The control device 101 is connected to the projection shooting device 102-1 and the projection shooting device 102-2 via the network 103, and makes communication therewith thereby to control the operations thereof. For example, the control device 101 causes the projection shooting device 102-1 and the projection shooting device 102-2 to project an image or to shoot a projection image. For example, the control device 101 can control the projection shooting device 102-1 and the projection shooting device 102-2 thereby to project one image.

Further, for example, the control device 101 performs processing of estimating a relative posture (such as rotational component or translational component) between the projection unit and the shooting unit, between the projection shooting device 102-1 and the projection shooting device 102-2. Further, the control device 101 can perform an image processing such as level correction or distortion correction on an overlap region between a projection image of the projection shooting device 102-1 and a projection image of the projection shooting device 102-2 by use of the estimation result, for example.

The projection shooting device 102-1 has a projection function, and can project an image on a screen 104. Further, the projection shooting device 102-1 has a shooting function, and can shoot a projection image projected on the screen 104. The projection shooting device 102-2 is similar to the projection shooting device 102-1, and has the similar configuration and the similar functions. When the projection shooting device 102-1 and the projection shooting device 102-2 do not need to be discriminated from each other for description, they are denoted as projection shooting device 102.

The projection shooting device 102-1 and the projection shooting device 102-2 are connected with each other via the network 103, and can exchange information (can make communication). Further, the projection shooting device 102-1 and the projection shooting device 102-2 are connected to the control device 101 via the network 103, and can exchange information with the control device 101 (can make communication), respectively. For example, the projection shooting device 102-1 and the projection shooting device 102-2 project an image on the screen 104 under control of the control device 101, respectively, thereby to project one image on the screen 104.

Further, the projection shooting device 102-1 can project an image on the screen 104 and the projection shooting device 102-2 can shoot the projection image thereby to acquire a shot image under control of the control device 101. Of course, the projection shooting device 102-2 can project an image on the screen 104 and the projection shooting device 102-1 can shoot the projection image thereby to acquire a shot image under control of the control device 101.

The network 103 is a communication network as communication medium between the control device 101 and the projection shooting devices 102. The network 103 may be any communication network, or a wired communication network, or a wireless communication network, or both of them. For example, it may be wired LAN, wireless LAN, public phone line network, a wideband communication network for wireless mobiles such as 3G line or 4G line, or Internet, or a combination thereof. Further, the network 103 may be a single communication network, or a plurality of communication networks. Further, for example, part or all of the network 103 may be configured of a communication cable with predetermined standard such as universal serial bus (USB) cable or High-Definition Multimedia Interface (HDMI) (registered trademark) cable.

The screen 104 is projected with an image from the shooting projection devices 102. The surface of the screen 104 on which an image is to be projected may be planar, or curved, or uneven. Further, it is described in FIG. 5 that the shooting projection device 102 projects an image on the screen 104, but the screen 104 is an exemplary surface on which the shooting projection device 102 projects an image. The shooting projection device 102 can project an image on any image-projectable object such as wall, building, floor, ceiling, calendar, dish, doll, or stationery.

<Outline of Projection Shooting Device>

Figure 6:
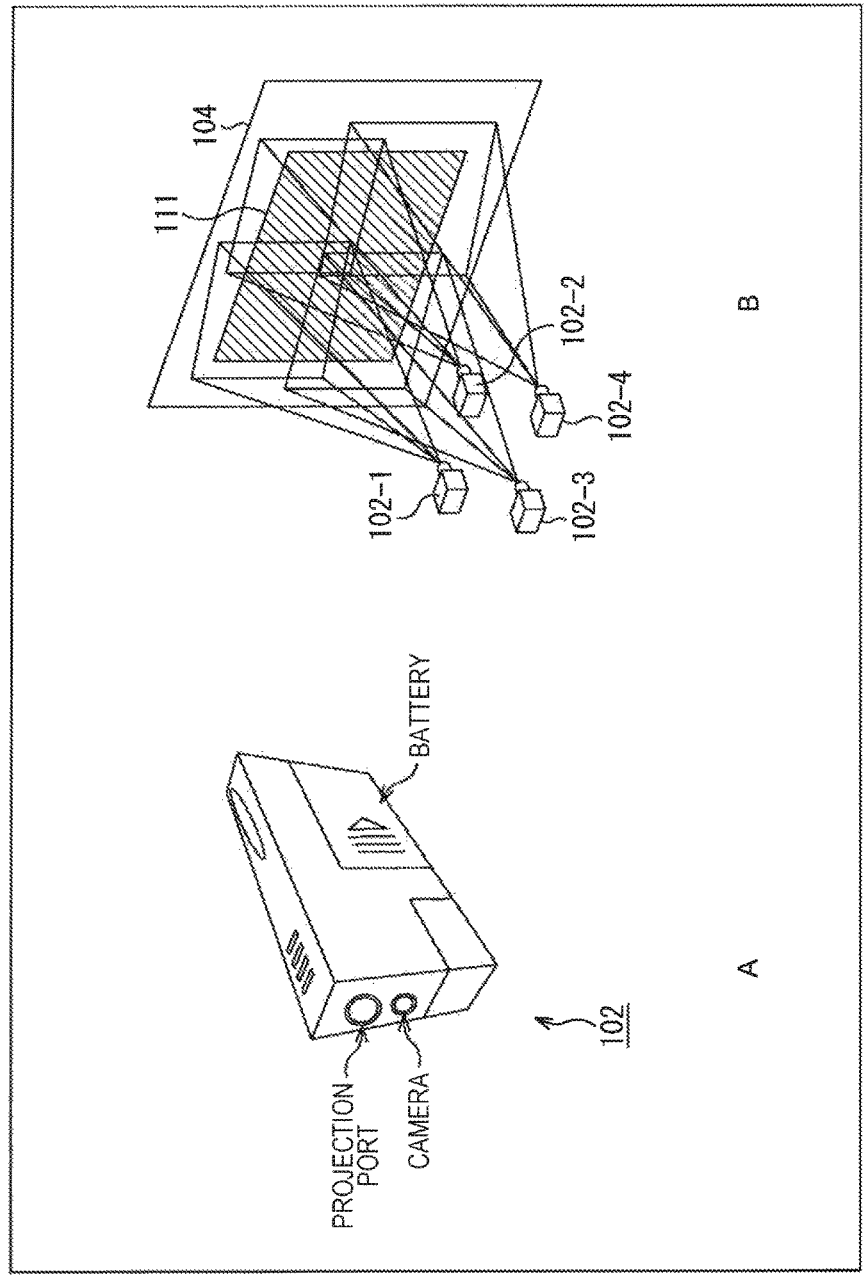
FIG. 6 is a diagram for explaining exemplary projection shooting devices.

An exemplary outer appearance of the projection shooting device 102 is illustrated in A of FIG. 6. The projection shooting device 102 has the projection function and the shooting function as described above, and its casing is provided with optical devices such as a projection port (lens mechanism) for projecting an image and a camera (lens mechanism) for shooting a subject. Further, the projection shooting device 102 may be any size of device such as portable (small) device. In this case, the casing of the projection shooting device 102 may be provided with a battery for enhancing portability as illustrated in A of FIG. 6.

As described above, a plurality of projection shooting devices 102 can project one image. There is illustrated, in B of FIG. 6, an example in which one image is projected on the screen 104 by use of four projection shooting devices 102 (the projection shooting device 102-1 to the projection shooting device 102-4). As illustrated in B of FIG. 6, the respective projection images projected from the projection shooting device 102-1 to the projection shooting device 102-4 form one image region 111, and one image is displayed in the image region 111. Of course, the respective projection images and the one image may be still images or animations.

Figure 7:
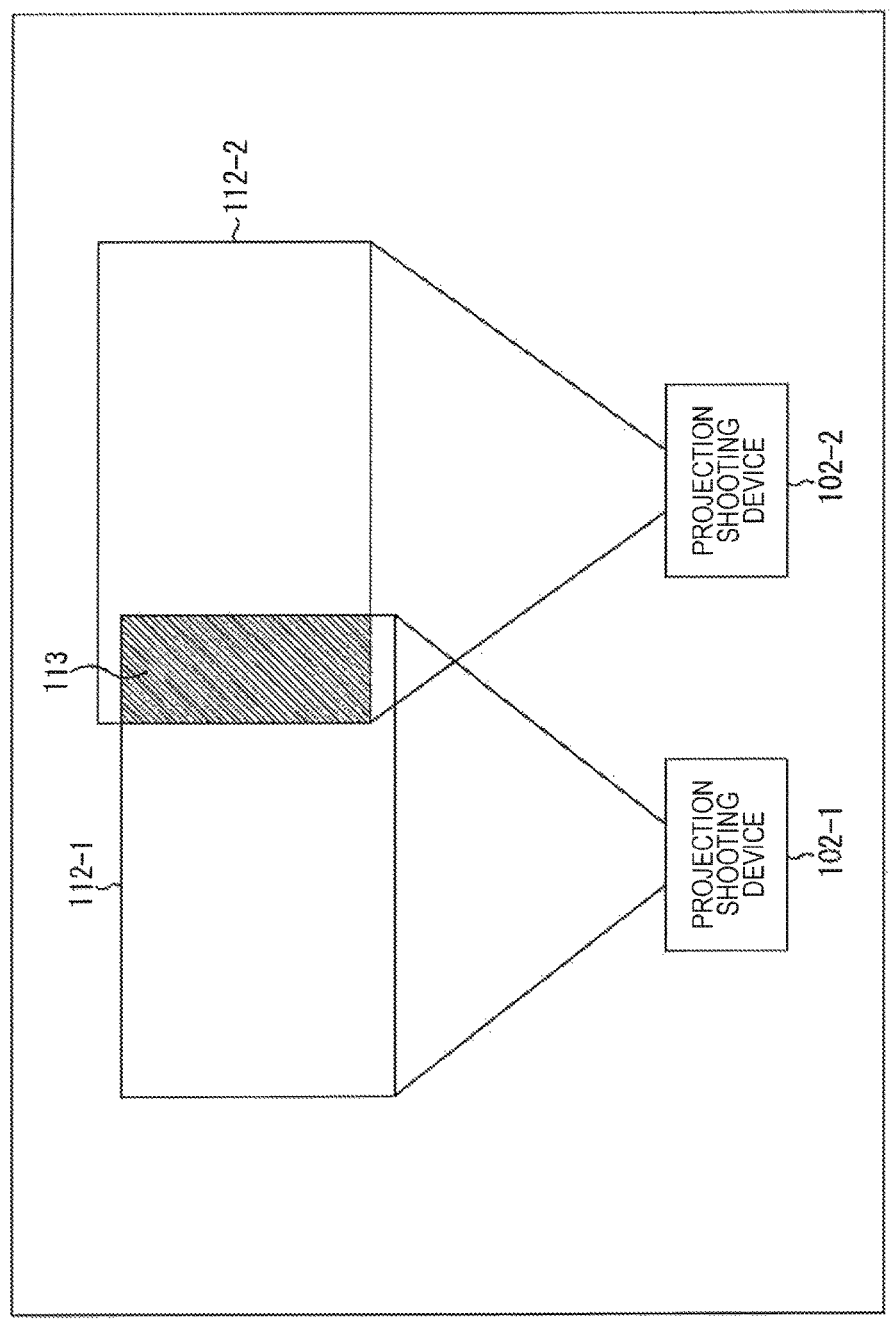
FIG. 7 is a diagram for explaining exemplary overlap region.

When one image region is formed by the respective projection images projected from the projection shooting devices 102 in this way, the respective projection images are difficult to arrange without any gap or a feeling of strangeness. Thus, as in the example illustrated in FIG. 7, the projection shooting devices 102 are arranged such that at least some of the respective projection images mutually overlap. In the example of FIG. 7, part of a projection image 112-1 of the projection shooting device 102-1 and part of a projection image 112-2 of the projection shooting device 102-2 mutually overlap (in the shaded part in FIG. 7). The shaded region is an overlap region 113.

As described above, luminance can be different from other region or an offset can be caused between the overlapping projection images in the overlap region 113, and thus the image processing for restricting a deterioration in image quality such as level correction or distortion correction may be required. The overlap region 113 needs to be detected for performing such an image processing. Thus, the control device 101 performs processing of detecting the overlap region 113.

<Control Device>

Figure 8:
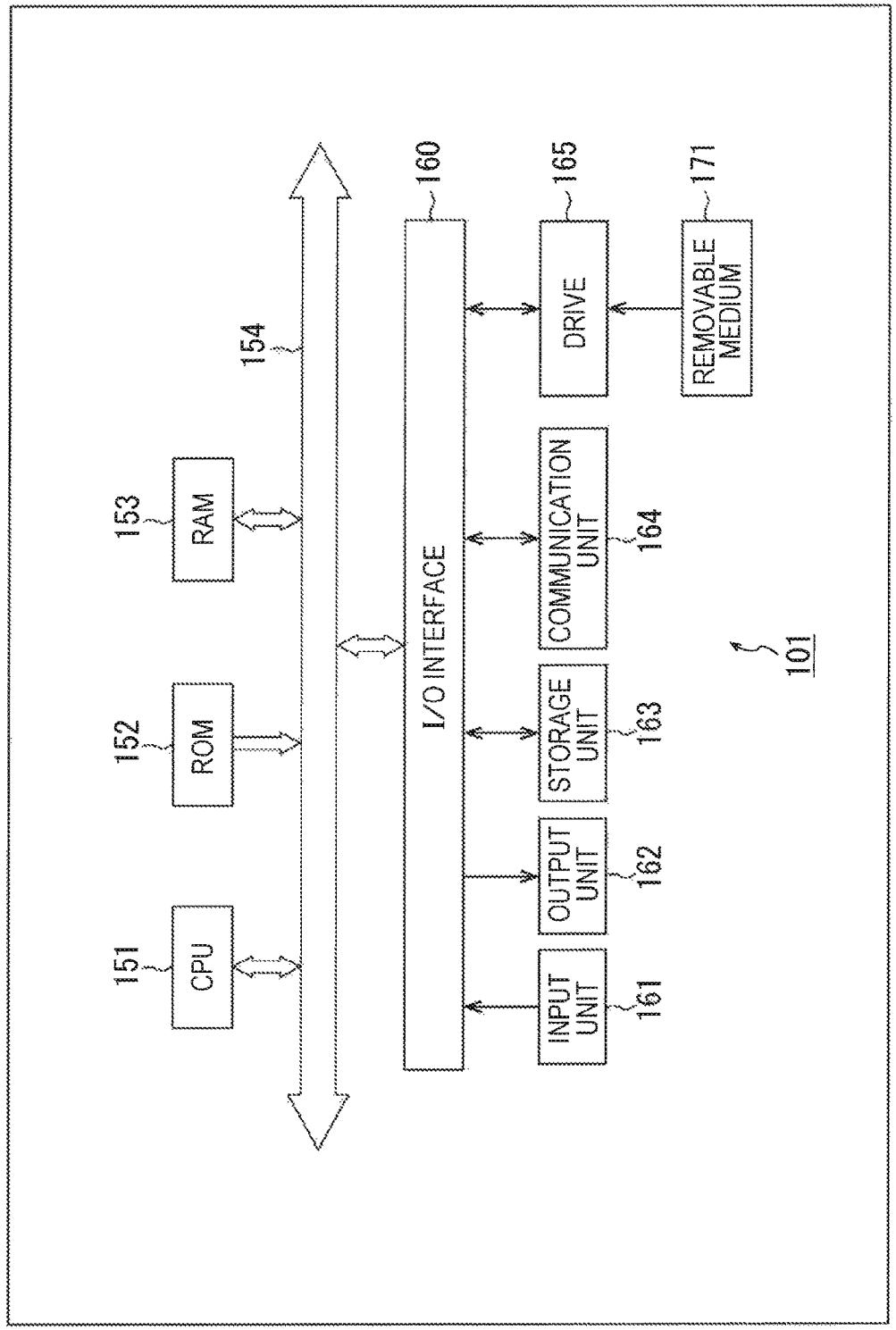
FIG. 8 is a block diagram illustrating exemplary main components of a control device.

FIG. 8 is a diagram illustrating exemplary main components of the control device 101 as one exemplary embodiment of the image processing apparatus to which the present technology is applied.

As illustrated in FIG. 8, in the control device 101, a central processing unit (CPU) 151, a read only memory (ROM) 152, and a random access memory (RAM) 153 are mutually connected via a bus 154.

The bus 154 is further connected with an I/O interface 160. The I/O interface 160 is further connected with an input unit 161, an output unit 162, a storage unit 163, a communication unit 164, and a drive 165.

The input unit 161 is configured of an input device for accepting external information via user input or the like. For example, the input unit 161 includes an operation button, touch panel, camera, microphone, input terminal, or the like. Further, the input unit 161 may include various sensors such as acceleration sensor, optical sensor and temperature sensor.

The output unit 162 is configured of an output device for outputting information on images or speeches. For example, the output unit 162 includes a display, speaker, output terminal, or the like.

The storage unit 163 is configured of a hard disc, RAM disc, a nonvolatile memory, or the like, for example. The communication unit 164 is configured of a network interface, for example. For example, the communication unit 164 is connected to the network 103 thereby to make communication with other device connected thereto via the network 103. The drive 165 drives a removable medium 171 such as magnetic disc, optical disc, magnetooptical disc, or semiconductor memory.

The CPU 151 loads and executes the programs stored in the storage unit 163 into the RAM 153 via the I/O interface 160 and the bus 154 thereby to perform various kinds of processing, for example. The RAM 153 stores therein data required by the CPU 151 for performing various kinds of processing as needed.

The programs executed by the CPU 151 can be recorded in the removable medium 171 as package medium, for example, to be provided to the control device 101. In this case, the removable medium 171 is mounted on the drive 165 so that the programs can be installed in the storage unit 163 via the I/O interface 160.

Further, the programs can be provided to the control device 101 via a wired or wireless transmission medium such as LAN, Internet, or digital satellite broadcasting. In this case, the programs can be received by the communication unit 164 and installed in the storage unit 163 via a wired or wireless transmission medium.

Additionally, the programs can be previously installed in the ROM 152 or the storage unit 163.

<Functional Blocks>

Figure 9:
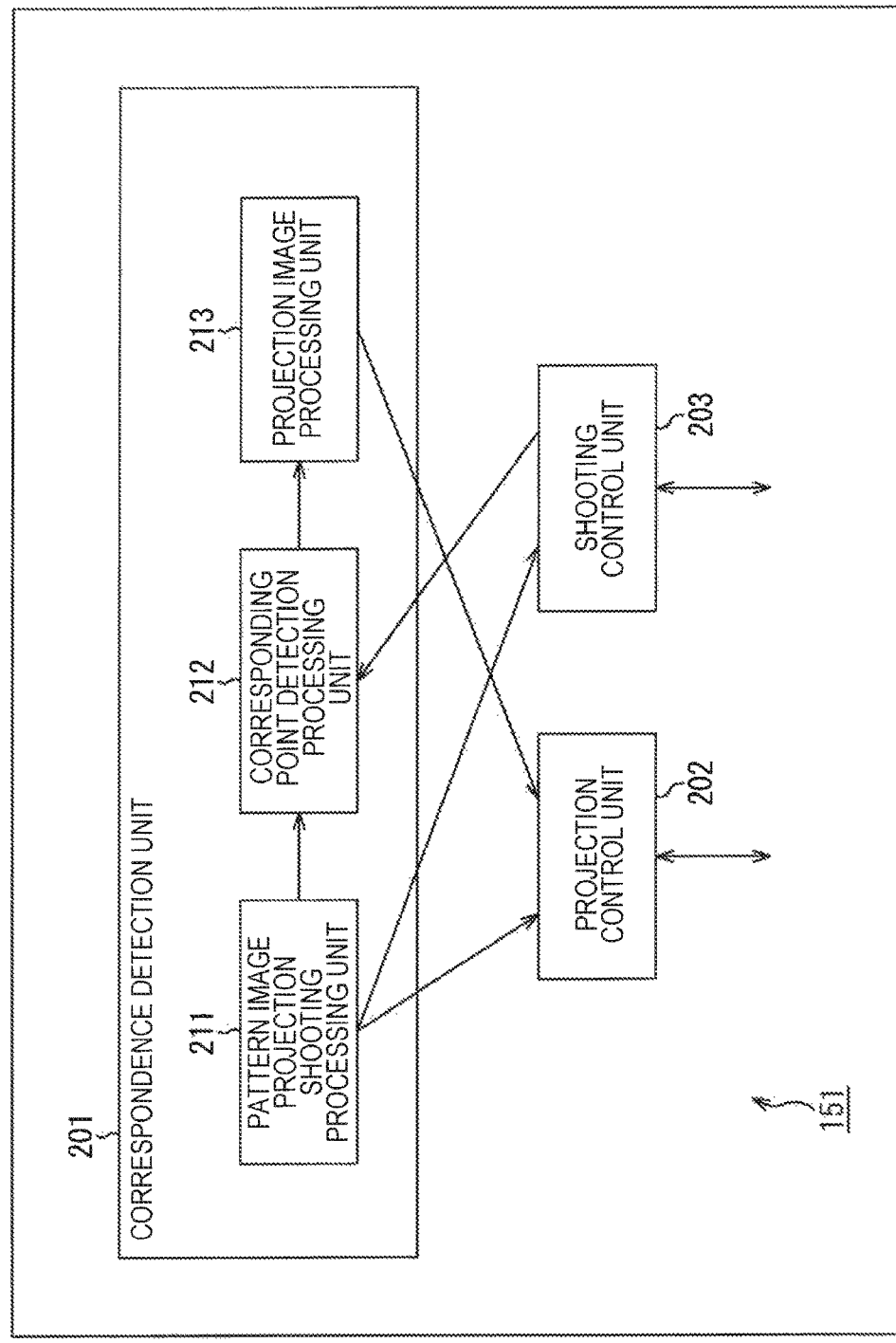
FIG. 9 is a functional block diagram illustrating an exemplary configuration of main functions realized by a CPU.

The CPU 151 in the control device 101 executes the programs thereby to realize various functions. FIG. 9 is a functional block diagram illustrating exemplary main functions realized by the CPU 151.

As illustrated in FIG. 9, the CPU 151 has the function blocks such as a correspondence detection unit 201, a projection control unit 202, and a shooting control unit 203. The correspondence detection unit 201 performs processing of detecting a correspondence between the projection unit and the shooting unit between the projection shooting devices 102. The projection control unit 202 performs processing of controlling the projection function of the projection shooting device 102. The shooting control unit 203 performs processing of controlling the shooting function of the projection shooting device 102.

The correspondence detection unit 201 has a pattern image projection shooting processing unit 211, a corresponding point detection processing unit 212, and a projection image processing unit 213.

The pattern image projection shooting processing unit 211 performs processing of projecting and shooting a pattern image for detecting a correspondence. For example, the pattern image projection shooting processing unit 211 controls the projection shooting device 102 via the projection control unit 202 thereby to project a predetermined pattern image on the screen 104. Further, for example, the pattern image projection shooting processing unit 211 controls the projection shooting device 102 via the shooting control unit 203 thereby to cause the projection shooting device 102 to shoot a projection image of the predetermined pattern image and to supply the shot image to the corresponding point detection processing unit 212. The shot image can be projected on the screen 104.

The corresponding point detection processing unit 212 performs processing of detecting corresponding points between the projection image and its shot image by use of the shot image acquired via the shooting control unit 203. The projection image processing unit 213 performs the image processing such as level correction or distortion correction on the projection image on the basis of the detected corresponding points. The projection image processing unit 213 controls the projection shooting device 102 via the projection control unit 202 thereby to project the image-processed image.

<Corresponding Point Detection Processing Unit>

Figure 10:
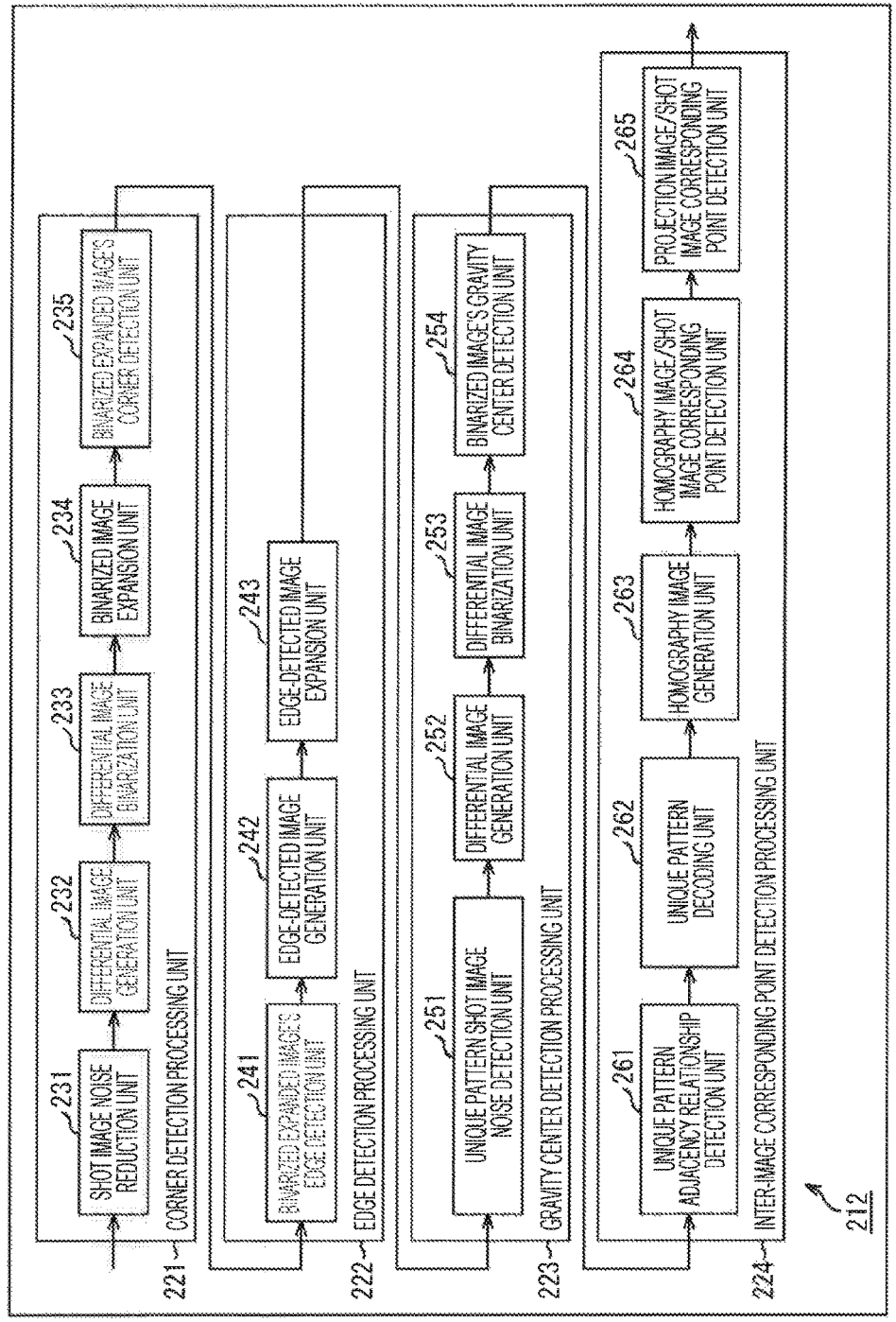
FIG. 10 is a functional block diagram illustrating an exemplary configuration of main functions of a corresponding point detection processing unit.

FIG. 10 is a functional block diagram illustrating exemplary main components of the corresponding point detection processing unit 212.

As illustrated in FIG. 10, the corresponding point detection processing unit 212 has a corner detection processing unit 221, an edge detection processing unit 222, a gravity center detection processing unit 223, and an inter-image corresponding point detection processing unit 224.

The corner detection processing unit 221 performs a corner detection processing. The corner detection processing unit 221 has a shot image noise reduction unit 231, a differential image generation unit 232, a differential image binarization unit 233, a binarized image expansion unit 234, and a binarized expanded image's corner detection unit 235.

The shot image noise reduction unit 231 performs an image processing of reducing noise on a shot image of a projection image with a predetermined pattern supplied from the projection shooting device 102. The differential image generation unit 232 generates a differential image between the noise-reduced shot images. The differential image binarization unit 233 binarizes the generated differential image. The binarized image expansion unit 234 expands a predetermined component (such as "white" part) of a binarized image as binarized differential image (increases the area). The binarized expanded image's corner detection unit 235 performs processing of detecting corners of the predetermined pattern included in a binarized expanded image as a binarized image with an expanded predetermined component.

The edge detection processing unit 222 performs an edge detection processing. The edge detection processing unit 222 has a binarized expanded image's edge detection unit 241, an edge-detected image generation unit 242, and an edge-detected image expansion unit 243. The binarized expanded image's edge detection unit 241 detects edges of the predetermined pattern included in the binarized expanded image. The edge-detected image generation unit 242 generates an edge-detected image indicating the edges on the basis of the edge detection result of the binarized expanded image's edge detection unit 241. The edge-detected image expansion unit 243 expands each edge of the generated edge-detected image (increases the area).

The gravity center detection processing unit 223 performs processing of detecting the center of gravity of each sub-pattern configuring a unique pattern. The unique pattern will be described below in detail. The gravity center detection processing unit 223 has a unique pattern shot image noise detection unit 251, a differential image generation unit 252, a differential image binarization unit 253, and a binarized image's gravity center detection unit 254. The unique pattern shot image noise detection unit 251 performs an image processing of reducing noise on a unique pattern shot image which is a shot image of a unique pattern projection image as a projection image of a unique pattern image including a plurality of different sub-patterns from others. The differential image generation unit 252 generates a differential image between the unique pattern shot image and a shot image of a projection image with other pattern. The differential image binarization unit 253 binarizes the generated differential image. The binarized image's gravity center detection unit 254 performs processing of detecting the center of gravity of each sub-pattern of a unique pattern included in a binarized image as binarized differential image.

The inter-image corresponding point detection processing unit 224 performs processing of detecting corresponding points between images. The inter-image corresponding point detection processing unit 224 has a unique pattern adjacency relationship detection unit 261, a unique pattern decoding unit 262, a homography image generation unit 263, a homography image/shot image corresponding point detection unit 264, and a projection image/shot image corresponding point detection unit 265. The unique pattern adjacency relationship detection unit 261 performs processing of detecting an adjacency relationship between sub-patterns forming a unique pattern. The unique pattern decoding unit 262 performs processing of analyzing the unique pattern on the basis of the detected adjacency relationships between sub-patterns. The homography image generation unit 263 performs processing of generating an image (homography image) which is a projection-transformed projection image by use of the unique pattern. The homography image/shot image corresponding point detection unit 264 performs processing of finding a correspondence between the homography image and a shot image on the basis of the unique pattern or the like. The projection image/shot image corresponding point detection unit 265 performs processing of finding a correspondence between the projection image and the shot image by use of the correspondence between the homography image and the shot image.

Each processing will be described below in detail.

<Projection Shooting Device>

Figure 11:
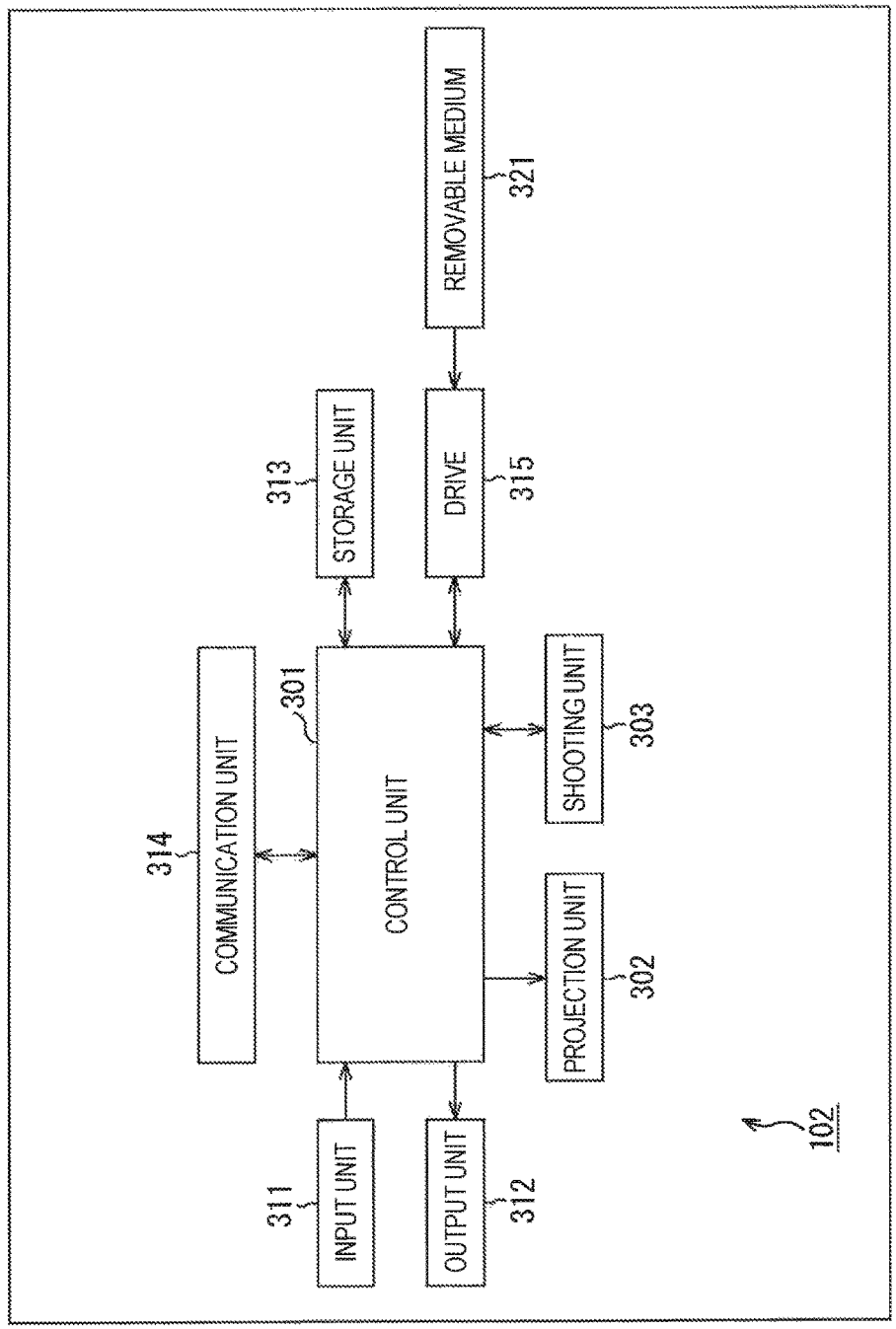
FIG. 11 is a block diagram illustrating exemplary main components of a projection shooting device.

FIG. 11 is a block diagram illustrating exemplary main components of the projection shooting device 102.

As illustrated in FIG. 11, the projection shooting device 102 has a control unit 301, a projection unit 302, a shooting unit 303, an input unit 311, an output unit 312, a storage unit 313, a communication unit 314, and a drive 315.

The control unit 301 is configured of CPU, ROM, RAM, or the like, for example, and controls each processing unit in the device and performs various kinds of processing required for the control such as image processing. The projection unit 302 performs processing of projecting an image under control of the control unit 301. For example, the projection unit 302 projects an image supplied from the control unit 301 on the outside of the projection shooting device 102 (such as the screen 104). That is, the projection unit 302 realizes the projection function.

The projection unit 302 scans a laser light by a MEMS mirror by use of the laser light as light source thereby to project an image. Of course, a light source of the projection unit 302 is arbitrary, and may be LED, xenon or the like not limited to laser light. The projection unit 302 will be described below in detail.

The shooting unit 303 shoots a subject outside the device and generates a shot image under control of the control unit 301, and supplies the shot image to the control unit 301. That is, the shooting unit 303 realizes the shooting function. For example, the shooting unit 303 shoots a projection image projected on the screen 304 by the projection unit 302.

The input unit 311 is configured of an input device for accepting external information via user input or the like. For example, the input unit 311 includes an operation button, touch panel, camera, microphone, input terminal, or the like. Further, the input unit 311 may include various sensors such as acceleration sensor, optical sensor, and temperature sensor.

The output unit 312 is configured of an output device for outputting information on images or speeches. For example, the output unit 312 includes a display, speaker, output terminal, or the like.

The storage unit 313 is configured of a hard disc, RAM disc, nonvolatile memory, or the like, for example. The communication unit 314 is configured of a network interface, for example. For example, the communication unit 314 is connected to the network 103 thereby to make communication with other device connected thereto via the network 103. The drive 315 drives a removable medium 321 such as magnetic disc, optical disc, magnetooptical disc, or semiconductor memory.

The control unit 301 loads and executes the programs stored in the storage unit 313 into the RAM incorporated therein thereby to perform various kinds of processing. The RAM stores therein data required by the control unit 301 for performing various kinds of processing as needed.

The programs executed by the control unit 301 can be recorded in the removable medium 321 as package medium, for example, to be provided to the projection shooting device 102. In this case, the removable medium 321 is mounted on the drive 315 so that the programs can be installed in the storage unit 313.

Further, the programs can be provided to the projection shooting device 102 via a wired or wireless transmission medium such as LAN, Internet, or digital satellite broadcasting. In this case, the programs can be received by the communication unit 314 and installed in the storage unit 313 via a wired or wireless transmission medium.

Additionally, the programs can be previously installed in the ROM or the storage unit 313 incorporated in the control unit 301.

Both the projection shooting device 102-1 and the projection shooting device 102-2 have such a configuration.

<Projection Unit>

Figure 12:
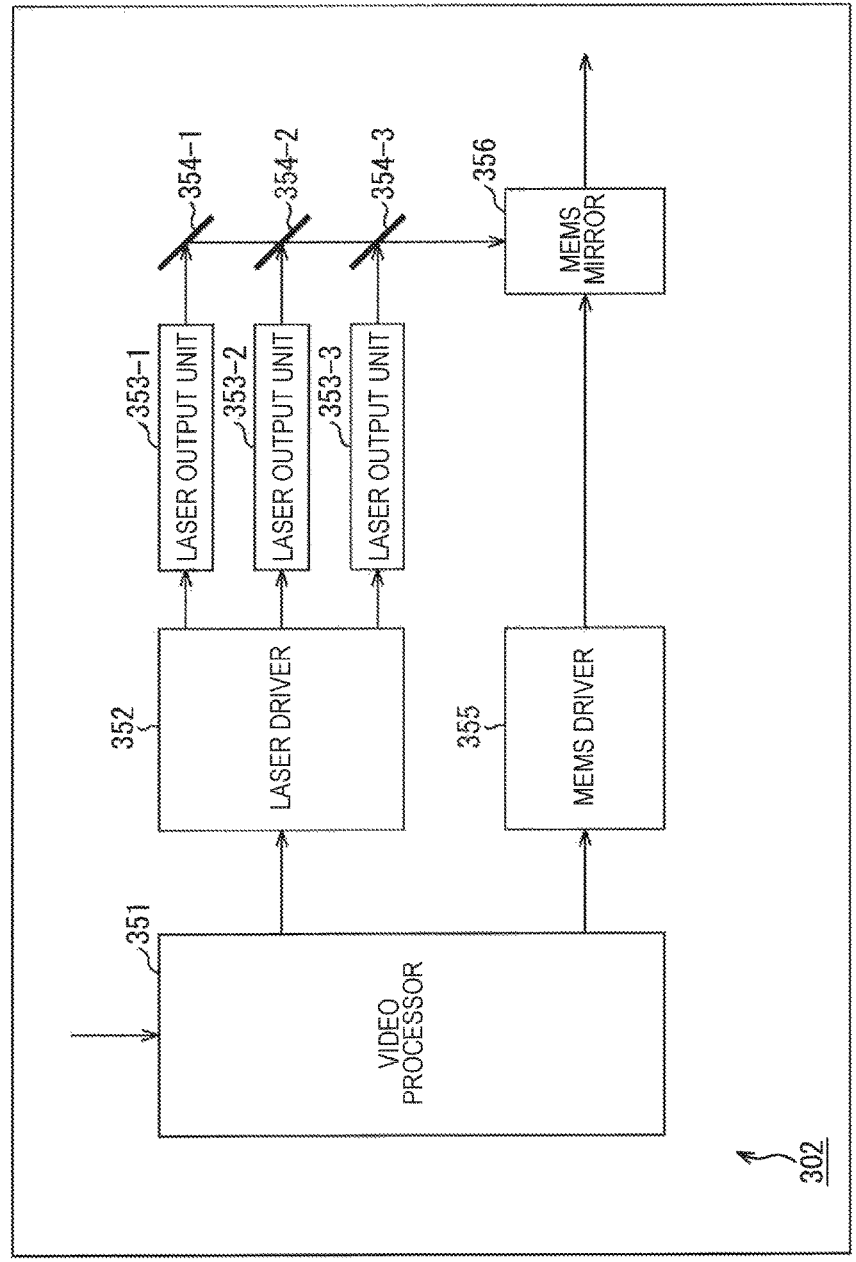
FIG. 12 is a block diagram illustrating exemplary main components of a projection unit.

FIG. 12 is a block diagram illustrating exemplary main components of the projection unit 302. As illustrated in FIG. 12, the projection unit 302 has a video processor 351, a laser driver 352, a laser output unit 353-1, a laser output unit 353-2, a laser output unit 353-3, a mirror 354-1, a mirror 354-2, a mirror 354-3, a micro electro mechanical systems (MEMS) driver 355, and a MEMS mirror 356.

The video processor 351 holds the images supplied from the control unit 301 and performs a necessary image processing on the images. The video processor 351 supplies the laser driver 352 or the MEMS driver 355 with the images to be projected.

The laser driver 352 controls the laser output unit 353-1 to the laser output unit 353-3 to project an image supplied from the video processor 351. The laser output unit 353-1 to the laser output unit 353-3 output the laser lights with mutually-different colors (wavelength bands) such as red, blue and green, respectively. That is, the laser driver 352 controls the laser output of each color to project an image supplied from the video processor 351. Additionally, when the laser output unit 353-1 to the laser output unit 353-3 do not need to be mutually discriminated for description, they are denoted as laser output unit 353.

The mirror 354-1 reflects a laser light output from the laser output unit 353-1 and guides it to the MEMS mirror 356. The mirror 354-2 reflects a laser light output from the laser output unit 353-2 and guides it to the MEMS mirror 356. The mirror 354-3 reflects a laser light output from the laser output unit 353-3 and guides it to the MEMS mirror 356. Additionally, when the mirror 354-1 to the mirror 354-3 do not need to be mutually discriminated for description, they are denoted as mirror 354.

The MEMS driver 355 controls the MEMS mirror 356 to drive, thereby projecting an image supplied from the video processor 351. The MEMS mirror 356 drives the mirror attached on the MEMS under control of the MEMS driver 355, thereby scanning a laser light of each color as in the example of FIG. 13, for example. The laser light is output to the outside of the device from the projection port to be applied on the screen 104, for example. Thereby, the image supplied form the video processor 351 is projected on the screen 104.

Additionally, in the example of FIG. 12, the description is made assuming that three laser output units 353 are provided to output three colors of laser lights, respectively, but any number of laser lights (or any number of colors) is possible. For example, four or more or two or less laser output units 353 may be employed. That is, two or less or four or more laser lights may be output from the projection shooting device 102 (the projection unit 302). Then, the number of colors of laser lights output from the projection shooting device 102 (the projection unit 302) is arbitrary, and two or less or four or more colors may be employed. Further, the configurations of the mirror 354 and the MEMS mirror 356 are arbitrary, and are not limited to the example of FIG. 12.

Figure 13:
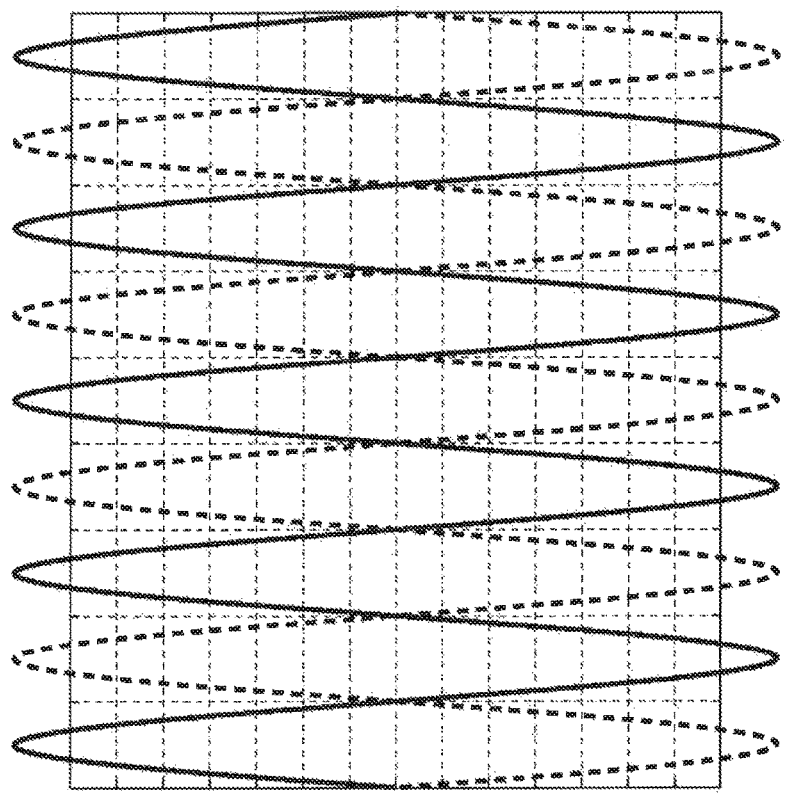
FIG. 13 is a diagram illustrating how to scan a laser light by way of example.

Of course, a laser light scanning pattern is arbitrary, and is not limited to the example of FIG. 13.

<Flow of Correspondence Detection Processing>

The flows of various kinds of processing performed by the control device 101 will be described below in order to perform the processing on the overlap region 113 as described above.

As processing on the overlap region 113, the correspondence detection unit 201 in the control device 101 performs the correspondence detection processing. The processing can be performed at any timing. For example, the correspondence detection unit 201 may perform the correspondence detection processing before starting to project one image by use of both the projection shooting device 102-1 and the projection shooting device 102-2. Further, the correspondence detection processing may be performed at a predetermined timing while an image is being projected.

An exemplary flow of the correspondence detection processing will be described with reference to the flowchart of FIG. 14.

When the correspondence detection processing is started, in step S101, the pattern image projection shooting processing unit 211 performs the pattern image projection shooting processing. When the pattern image projection shooting processing ends, in step S102, the corresponding point detection processing unit 212 performs the corresponding point detection processing. When the corresponding point detection processing ends, in step S103, the projection image processing unit 213 corrects a projection image to be projected or being projected on the basis of the correspondence detected in step S102. That is, the projection image processing unit 213 performs the image processing on the overlap region of the projection image. When the processing in step S103 ends, the correspondence detection processing ends.

<Flow of Pattern Image Projection Shooting Processing>

An exemplary flow of the pattern image projection shooting processing performed in step S101 in FIG. 14 will be described below with reference to the flowchart of FIG. 15. The description will be made with reference to FIG. 16 as needed.

When the pattern image projection shooting processing is started, the pattern image projection shooting processing unit 211 selects a pattern image to be projected from among the unprocessed (non-projected) pattern images in step S121.

Figure 16:
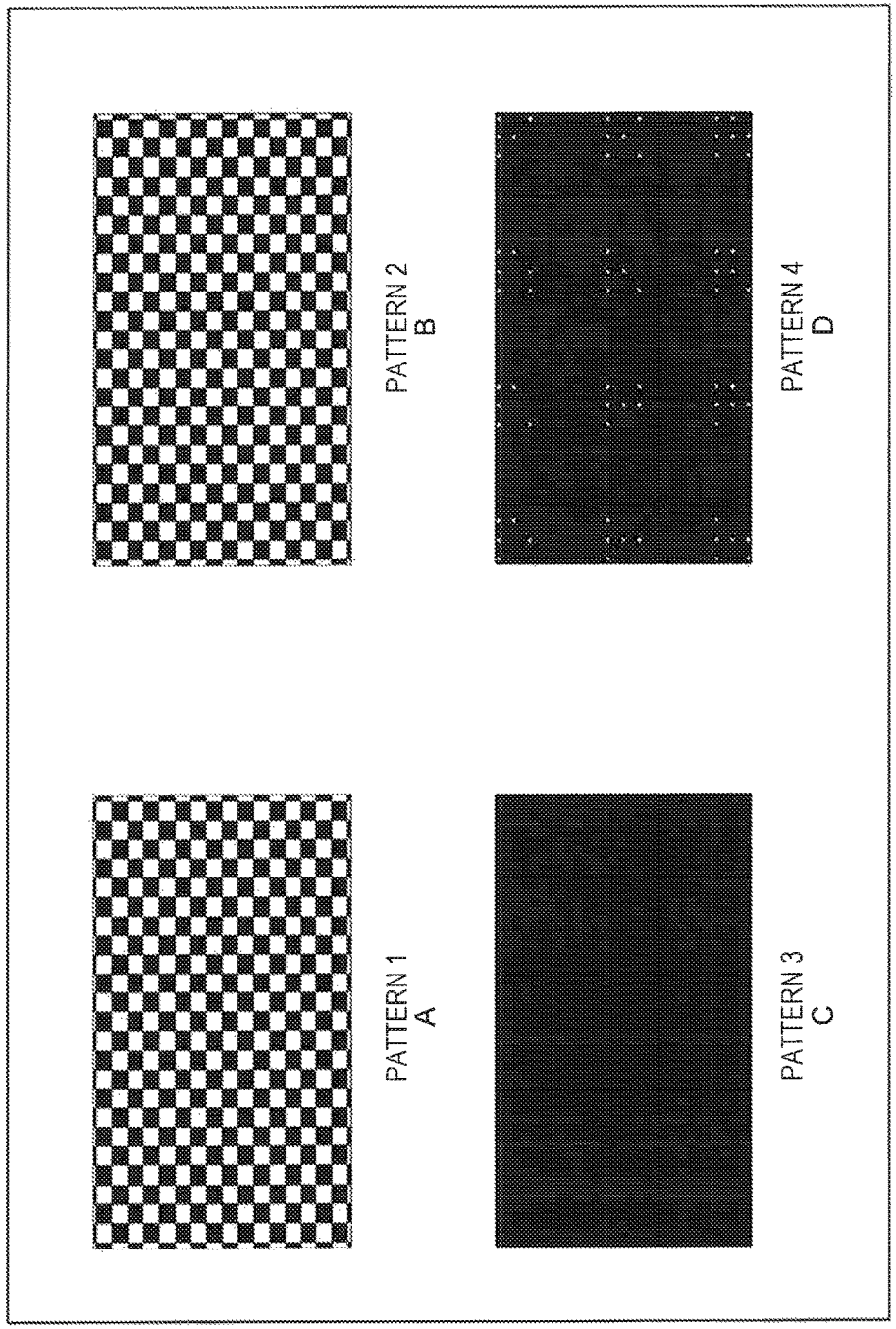
FIG. 16 is a diagram illustrating the pattern image projection shooting processing by way of example.

The pattern image is a previously-prepared image with a predetermined pattern, and corresponding points are detected (an overlap region is detected) by use of the pattern image. FIG. 16 illustrates the pattern images by way of example. The pattern image with pattern 1 illustrated in A of FIG. 16 is an image with two-color (black and white, for example) check pattern (checker). The pattern image with pattern 2 illustrated in B of FIG. 16 is an image with two-color (black and white, for example) check pattern (checker) similar to pattern 1. Additionally, the pattern 2 is reverse to the pattern 1 in positive and negative (black and white).

The pattern image with pattern 3 illustrated in C of FIG. 16 is a black image. The pattern image with pattern 4 illustrated in D of FIG. 16 is an image where a plurality of (white, for example) unique patterns are superimposed on a black image. This unique pattern is configured of a plurality of sub-patterns, and each unique pattern is different from other unique patterns in the number of sub-patterns or a positional relationship between patterns. That is, the unique pattern is configured of a group of sub-patterns arranged in unique arrangement pattern, and can be discriminated from other unique patterns due to the number of sub-patterns, the positional relationship, or the like. The number, shape, and size of sub-patterns configuring the unique pattern are arbitrary. All the sub-patterns may have the same size or shape, or may be mutually different. In the example of D of FIG. 16, each sub-pattern is a dotted graphic (white point).

Returning to FIG. 15, the pattern image projection shooting processing unit 211 selects a pattern image to be projected (an image to be processed this time) from among the unprocessed (non-projected) pattern images in the images with pattern 1 to pattern 4, for example.

In step S122, the pattern image projection shooting processing unit 211 selects a projection unit 302 for projecting the selected pattern image (a projection unit 302 to be processed) from among the unprocessed projection units 302 (which do not project the selected pattern image) in each projection shooting device 102.

In step S123, the pattern image projection shooting processing unit 211 causes the projection unit 302 selected in step S122 to project the pattern image selected in step S121 on the screen 104.

In step S124, the pattern image projection shooting processing unit 211 selects a shooting unit 303 (a shooting unit 303 to be processed) for shooting the pattern image projected on the screen 104 (pattern projection image) from among the unprocessed shooting units 303 (which do not shoot the projected pattern image) in each projection shooting device 102.

In step S125, the pattern image projection shooting processing unit 211 causes the shooting unit 303 selected in step S124 to shoot the pattern image projected on the screen 104 (pattern projection image) in step S123.

In step S126, the pattern image projection shooting processing unit 211 determines whether to have caused all the shooting units 303 to shoot the pattern projection image projected on the screen 104. When it is determined that an unprocessed shooting unit 303 is present, the processing returns to step S124 and a series of processing in step S124 and subsequent steps is repeatedly performed.

That is, a series of processing from step S124 to step S126 is repeatedly performed so that the projected pattern projection image is shot by all the shooting units 303.

In step S126, when it is determined that all the shooting units 303 are caused to shoot the pattern projection image projected on the screen 104, the processing proceeds to step S127.

In step S127, the pattern image projection shooting processing unit 211 determines whether to have caused all the projection units 302 to project the selected pattern image to be processed. When it is determined that an unprocessed projection unit 302 is present, the processing returns to step S122 and a series of processing in step S122 and subsequent steps is repeatedly performed.

That is, a series of processing in step S122 to step S127 is repeatedly performed so that the pattern image to be processed is projected by all the projection units 302 and the pattern projection image projected by each projection unit 302 is shot by all the shooting units 303.

In step S127, when it is determined that all the projection units 302 are caused to project the pattern image to be processed, the processing proceeds to step S128.

In step S128, the pattern image projection shooting processing unit 211 determines whether to have projected all the pattern images. When it is determined that an unprocessed pattern image is present, the processing returns to step S121 and a series of processing in step S121 and subsequent steps is repeatedly performed.

That is, a series of processing in step S121 to step S128 is repeatedly performed so that all the pattern images are projected by all the projection units 302 and the pattern projection image projected by each projection unit 302 is shot by all the shooting units 303.

Figure 14:
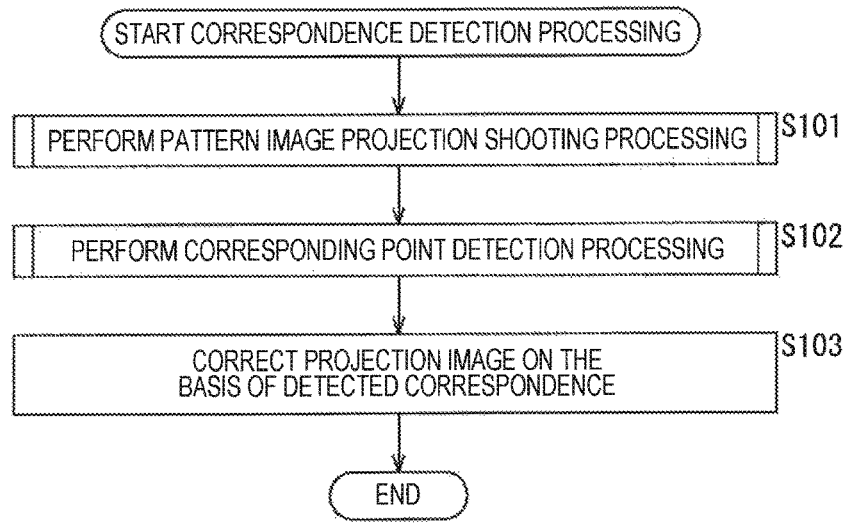
FIG. 14 is a flowchart for explaining an exemplary flow of a correspondence detection processing.
Figure 15:
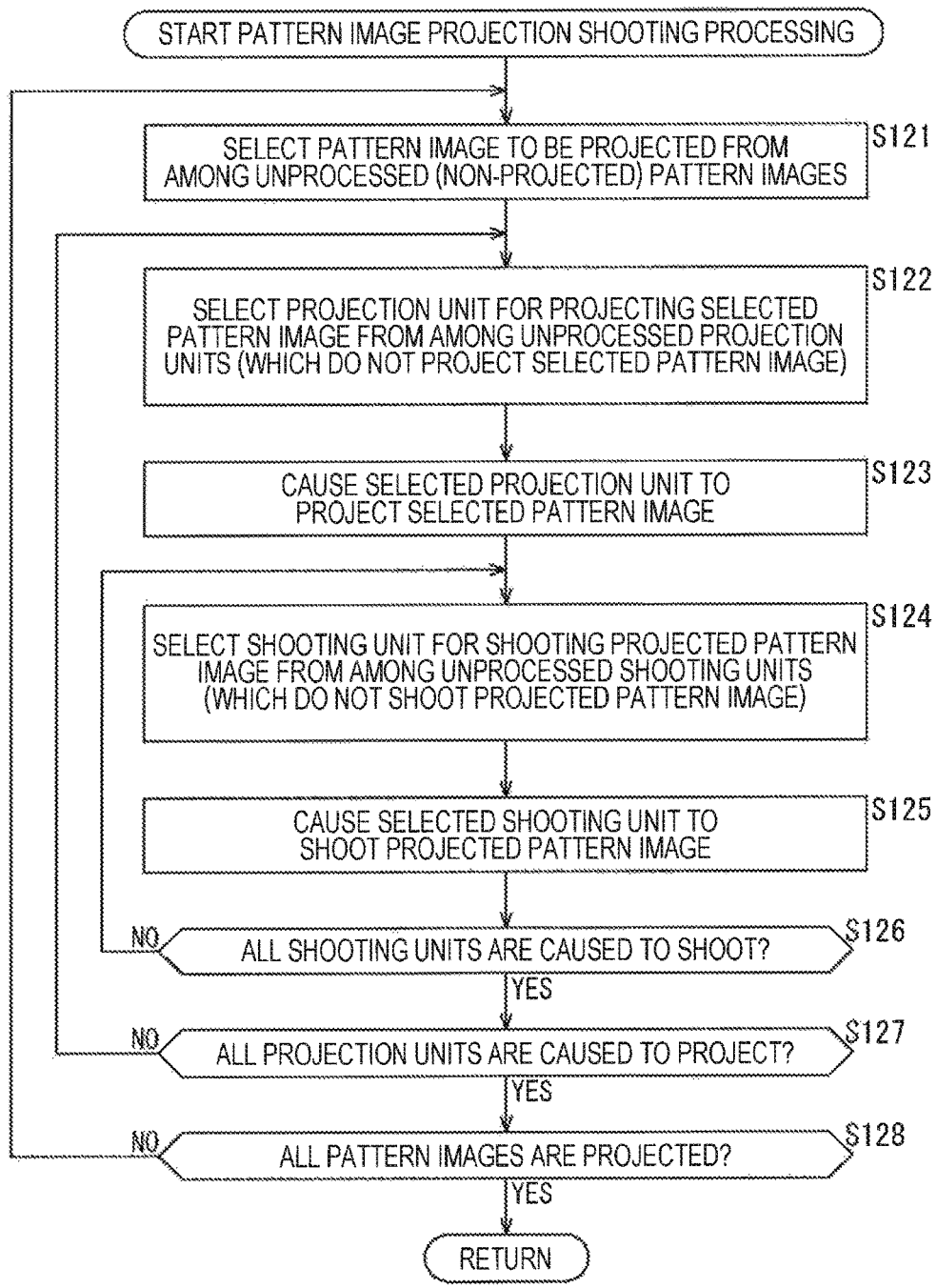
FIG. 15 is a flowchart for explaining an exemplary flow of a pattern image projection shooting processing.

In step S128, when it is determined that all the pattern images are projected, the pattern image projection shooting processing ends and the processing returns to FIG. 14.

That is, the outline of the processing order is a loop of selection of a pattern image, selection of a projection unit 302, and selection of a shooting unit 303. At first, a pattern image to be processed is selected, and then a projection unit 302 for projecting the pattern is selected. Then, the pattern projection image projected by the projection unit 302 is shot by all the shooting units 303. When the shooting ends, the projection unit 302 for projecting the pattern image to be processed is changed and the pattern projection image is shot by all the shooting units 303. The series of processing is repeatedly performed, and when the pattern image to be processed is projected by all the projection units 302, the pattern image to be processed is changed, and the series of processing described above is repeatedly performed. In this way, when all the pattern images are projected by all the projection units 302 and each projection image is shot by all the shooting units 303 (the shot images of all the projection images of all the pattern images are acquired by all the shooting units 303), the pattern image projection shooting processing is terminated.

Additionally, in the loop processing described above, the shooting by the same shooting unit 303 as the projection unit 302 for projecting the pattern image may be omitted.

<Flow of Corresponding Point Detection Processing>

When the pattern image projection shooting processing ends, the corresponding point detection processing is performed. An exemplary flow of the corresponding point detection processing performed in step S102 in FIG. 14 will be described below with reference to the flowchart of FIG. 17.

When the corresponding point detection processing is started, the corresponding point detection processing unit 212 selects a group of shot images to be processed from among the unprocessed groups of shot images in step S141.

Herein, the shot images of the pattern images acquired as described above are grouped by the projection units 302 for projecting the pattern images and the shooting units 303 acquiring the shot images. That is, the shot images of all the pattern images, which are projected by one projection unit 302 and shot by one shooting unit 303, are assumed as a group of shot images. For example, in the example of FIG. 5, the shot images with pattern 1 to pattern 4 (FIG. 16), which are projected by the projection unit 302 in the projection shooting device 102-1 and projected by the shooting unit 303 in the projection shooting device 102-2, are assumed as a group of shot images, and the shot images with pattern 1 to pattern 4 (FIG. 16), which are projected by the projection unit 302 in the projection shooting device 102-2 and projected by the shooting unit 303 in the projection shooting device 102-1, are assumed as a group of shot images.

In step S141, a group of shot images with such a configuration is selected.

When a group of shot images to be processed is selected, in step S142, the corner detection processing unit 221 performs the corner detection processing on the checker shot images of the group of shot images to be processed.

In step S143, the edge detection processing unit 222 performs the edge detection processing on the binarized expanded images of the group of shot images to be processed.

In step S144, the gravity center detection processing unit 223 performs the gravity center detection processing on the unique pattern shot images of the group of shot images to be processed.

In step S145, the inter-image corresponding point detection processing unit 224 performs the inter-image corresponding point detection processing on the group of shot images to be processed.

In step S146, the corresponding point detection processing unit 212 determines whether to have processed all the groups of shot images. When it is determined that an unprocessed group of shot images is present, the processing returns to step S141 and a series of processing in step S141 and subsequent steps is repeatedly performed.

In this way, a series of processing in step S141 to step S146 is performed on each group of shot images. Then in step S146, when it is determined that all the groups of shot images are processed, the corresponding point detection processing ends and the processing returns to FIG. 14.

<Flow of Corner Detection Processing>

Figure 18:
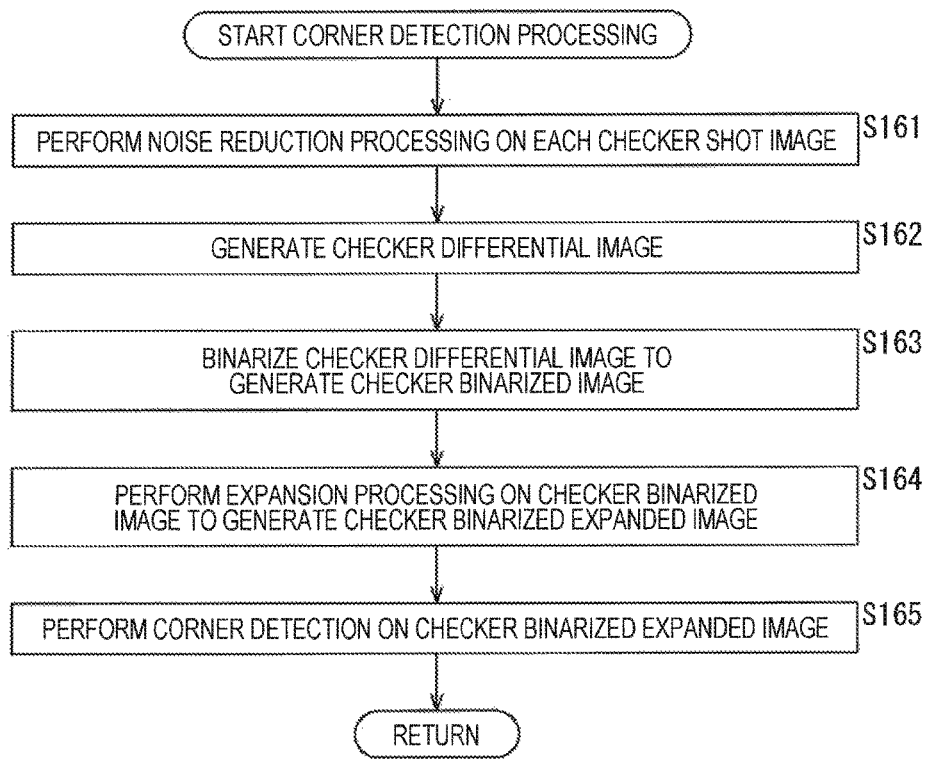
FIG. 18 is a flowchart for explaining an exemplary flow of a corner detection processing.

An exemplary flow of the corner detection processing will be described below with reference to the flowchart of FIG. 18. Herein, the pattern image with pattern 1 or pattern 2 illustrated in FIG. 16 is also denoted as checker image, a projection image of the checker image is also denoted as checker projection image, and a shot image of the checker projection image is also denoted as checker shot image.

Figure 19:
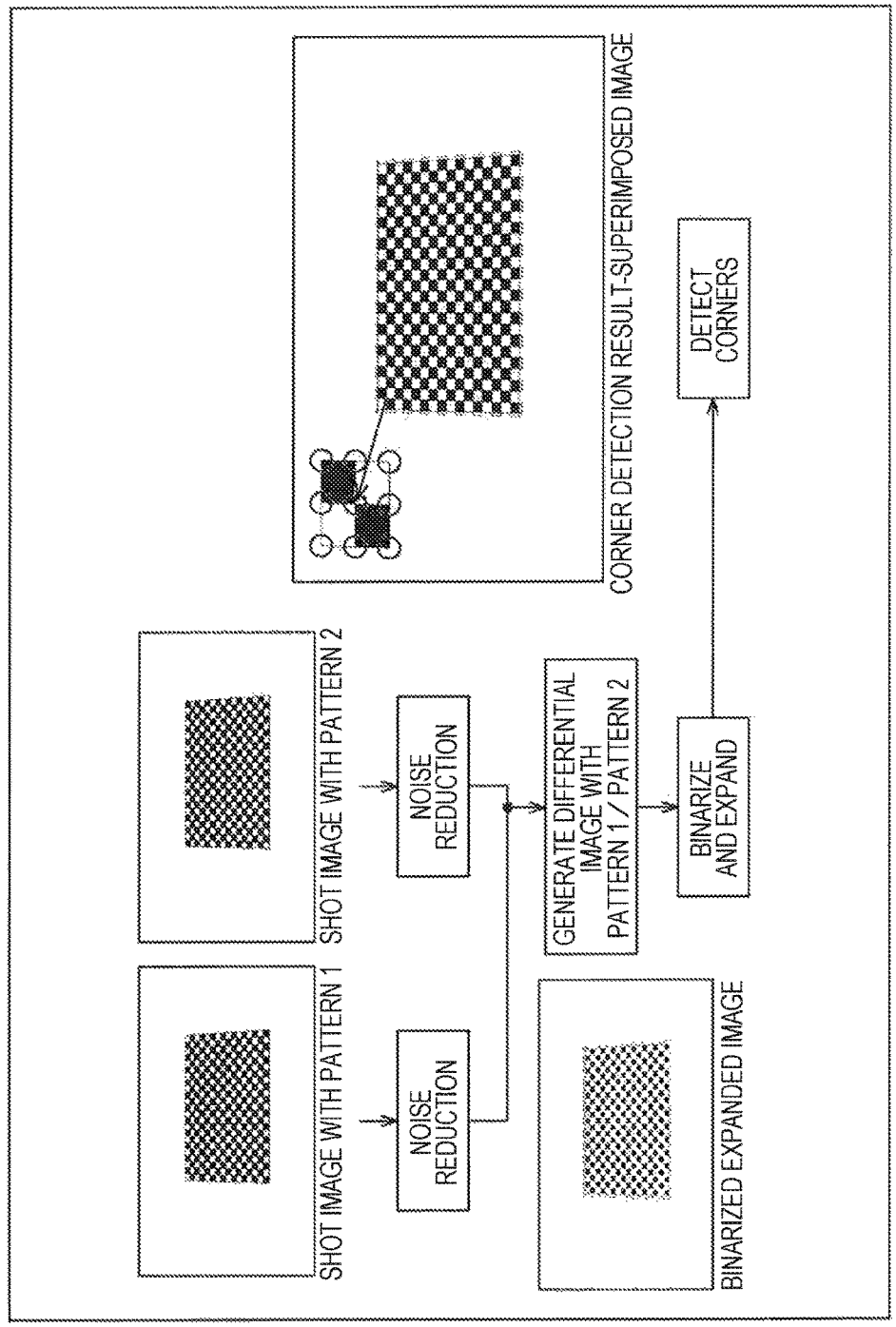
FIG. 19 is a diagram illustrating the corner detection processing by way of example.

When the corner detection processing is started, in step S161, the shot image noise reduction unit 231 performs the noise reduction processing on each checker shot image (the shot image with pattern 1 and the shot image with pattern 2 in FIG. 19) as in the example illustrated in FIG. 19.

In step S162, the differential image generation unit 232 generates a differential mage between the noise-reduced checker shot images as in the example illustrated in FIG. 19. The differential image is also denoted as checker differential image.

In step S163, the differential image binarization unit 233 binarizes the checker differential image as in the example illustrated in FIG. 19. The binarized checker differential image is also denoted as checker binarized image.

In step S164, the binarized image expansion unit 234 performs the expansion processing on the checker binarized image as in the example illustrated in FIG. 19 thereby to expand a predetermined component (such as white part) thereof. The checker binarized image subjected to the expansion processing is also denoted as checker binarized expanded image.

In step S165, the binarized expanded image's corner detection unit 235 detects the corners of the checker binarized expanded image thereby to detect each corner of the checker (check pattern).

Figure 17:
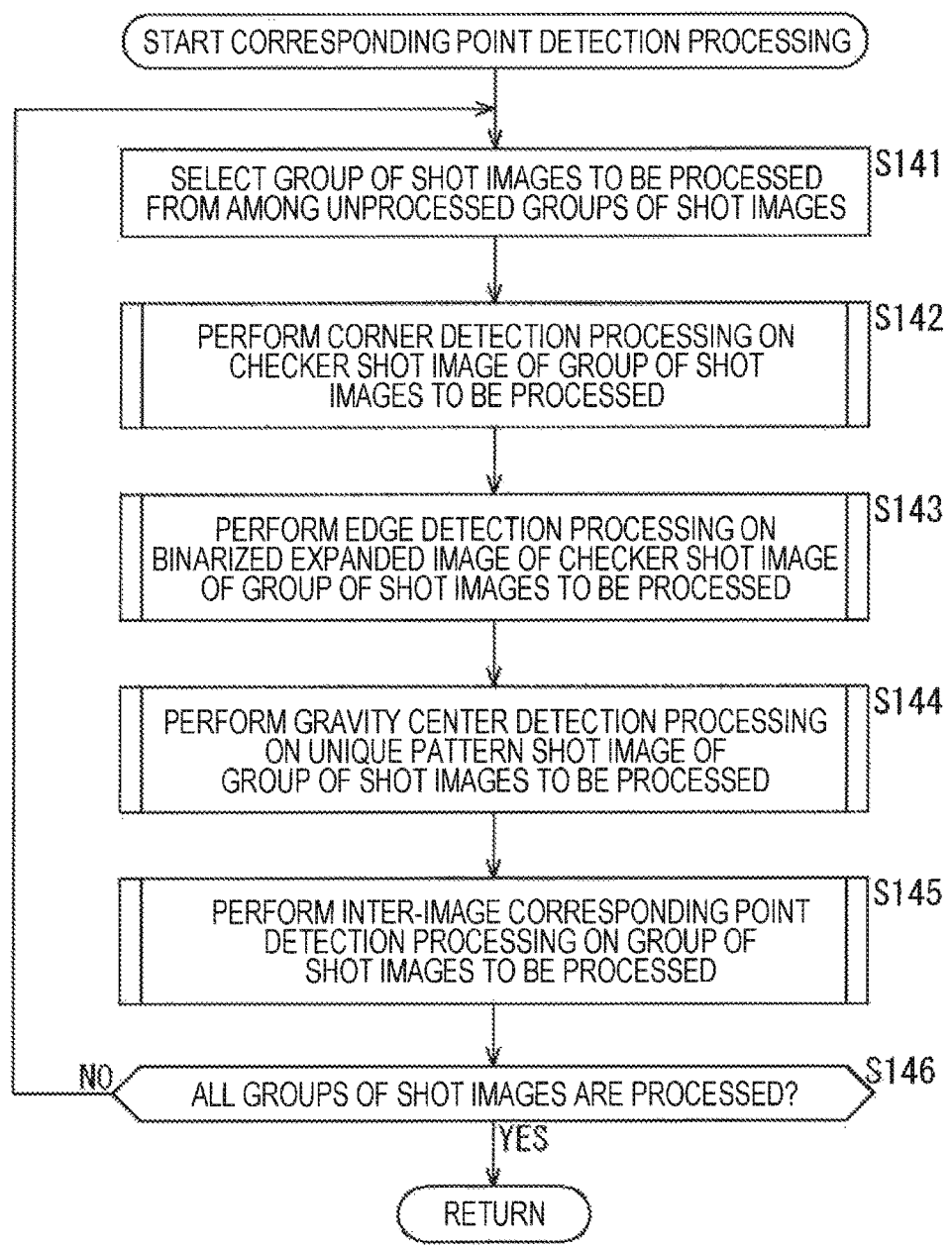
FIG. 17 is a flowchart for explaining an exemplary flow of a corresponding point detection processing.

When the processing in step S165 ends, the processing returns to FIG. 17.

As described above, the pattern 1 and the pattern 2 are the images with inverted positive/negative (such as black and white), and thus a checker differential image is reduced in effects of color of the screen 104 or external light. Therefore, corner detection is performed by use of such a checker differential image thereby to detect the corners of the checker (check pattern) more robustly (or thereby to enhance robustness of the corner detection).

<Flow of Edge Detection Processing>

Figure 20:
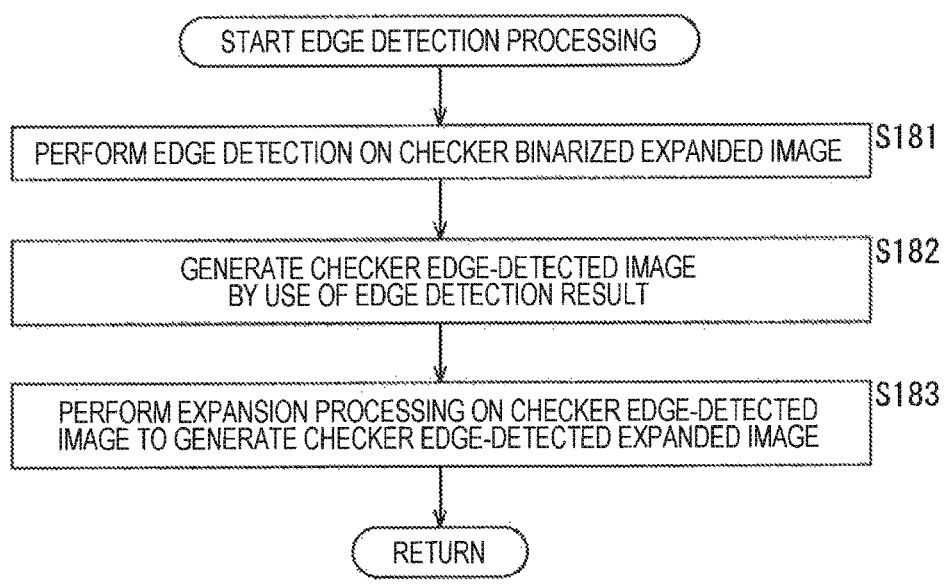
FIG. 20 is a flowchart for explaining an exemplary flow of an edge detection processing.

An exemplary flow of the edge detection processing performed in step S143 in FIG. 17 will be described below with reference to the flowchart of FIG. 20.

Figure 21:
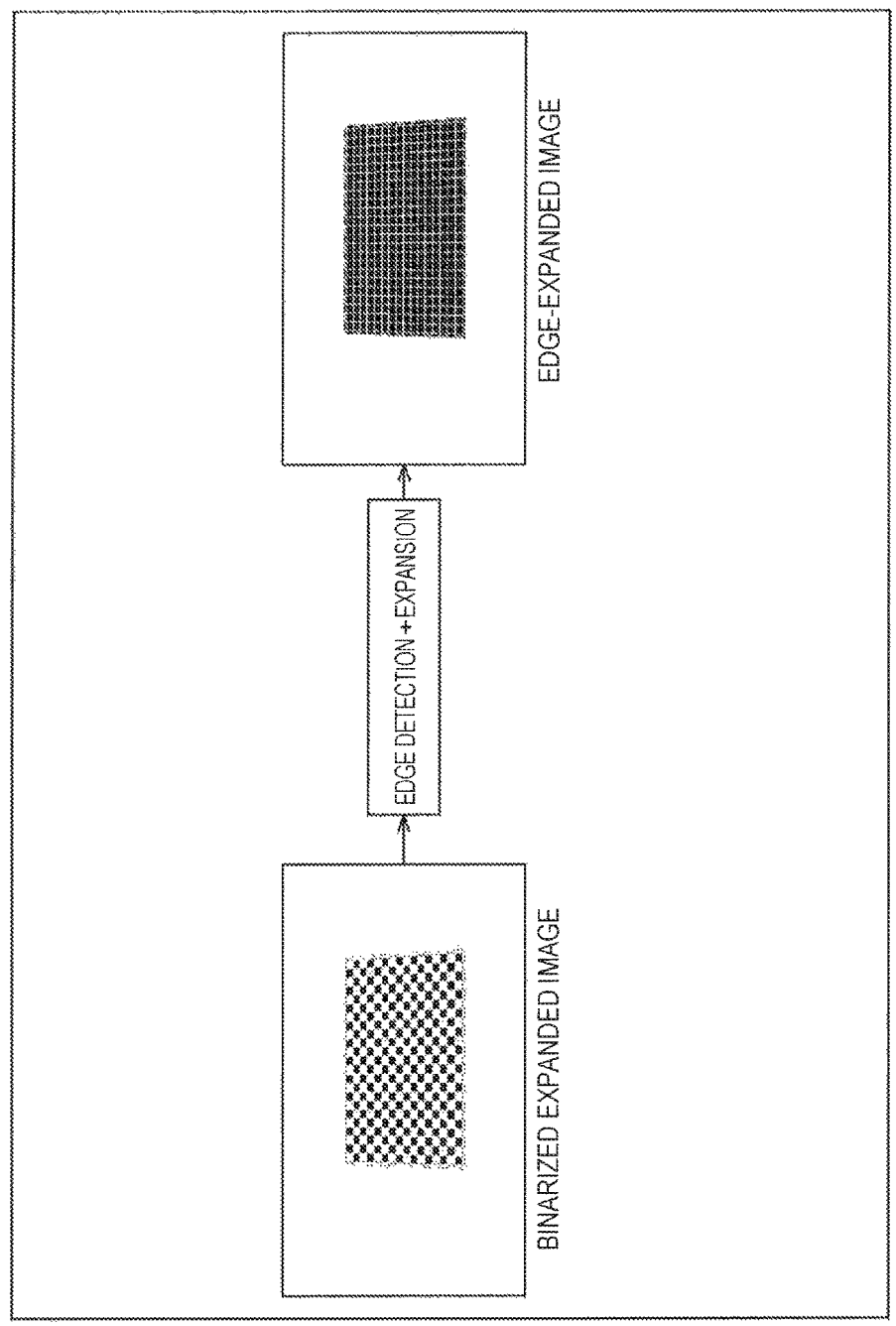
FIG. 21 is a diagram illustrating the edge detection processing by way of example.

When the edge detection processing is started, in step S181, the binarized expanded image's edge detection unit 241 detects the edges of the checker binarized expanded image acquired in the corner detection processing thereby to detect each edge of the checker (check pattern) as in the example illustrated in FIG. 21.

In step S182, the edge-detected image generation unit 242 generates a checker edge-detected image as image of the edges by use of the edge detection result in step S181 as in the example illustrated in FIG. 21.

In step S183, the edge-detected image expansion unit 243 performs the expansion processing on the checker edge-detected image thereby to expand the edges as in the example illustrated in FIG. 21. The checker edge-detected image subjected to the expansion processing is also denoted as checker edge-detected expanded image.

When the processing in step S183 ends, the edge detection processing ends and the processing returns to FIG. 17.

As described above, a checker differential image is used also for the edge detection. Therefore, it is possible to detect the edges of a checker (check pattern) more robustly (to enhance robustness of the edge detection).

<Flow of Gravity Center Detection Processing>

Figure 22:
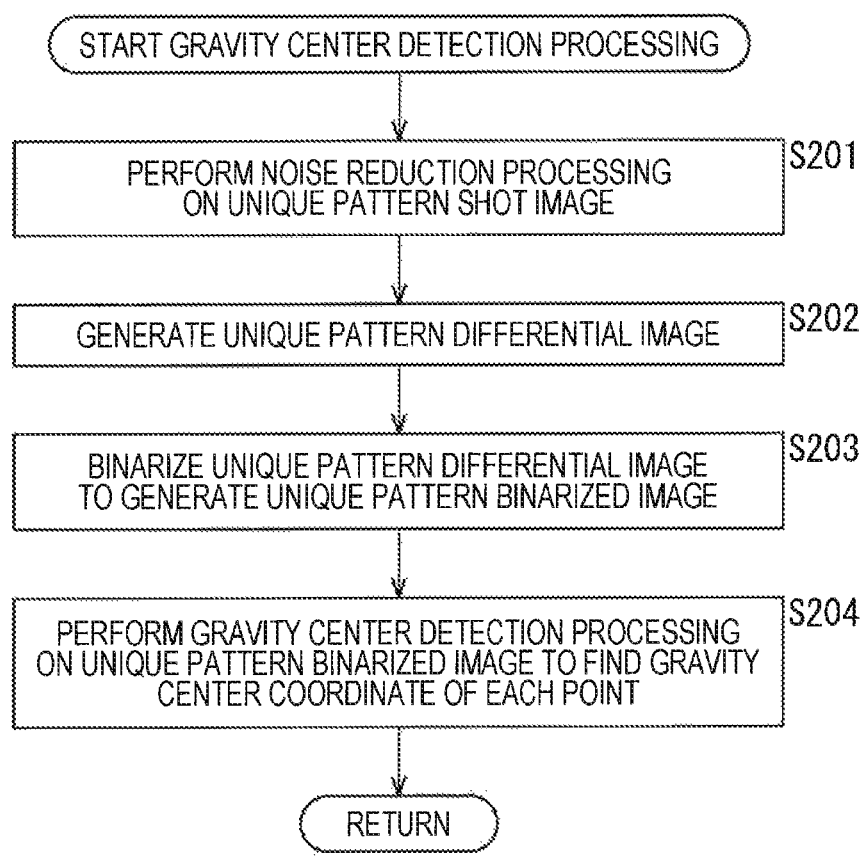
FIG. 22 is a flowchart for explaining an exemplary flow of a gravity center detection processing.

An exemplary flow of the gravity center detection processing performed in step S144 in FIG. 17 will be described below with reference to the flowchart of FIG. 22. Herein, the pattern image with pattern 3 illustrated in C of FIG. 16 is also denoted as black image, a projection image of the black image is also denoted as black projection image, and a shot image of the black projection image is also denoted as black shot image. Further, the pattern image with pattern 4 illustrated in D of FIG. 16 is also denoted as unique pattern image, a projection image of the unique pattern image is also denoted as unique pattern projection image, and a shot image of the unique pattern projection image is also denoted as unique pattern shot image.

Figure 23:
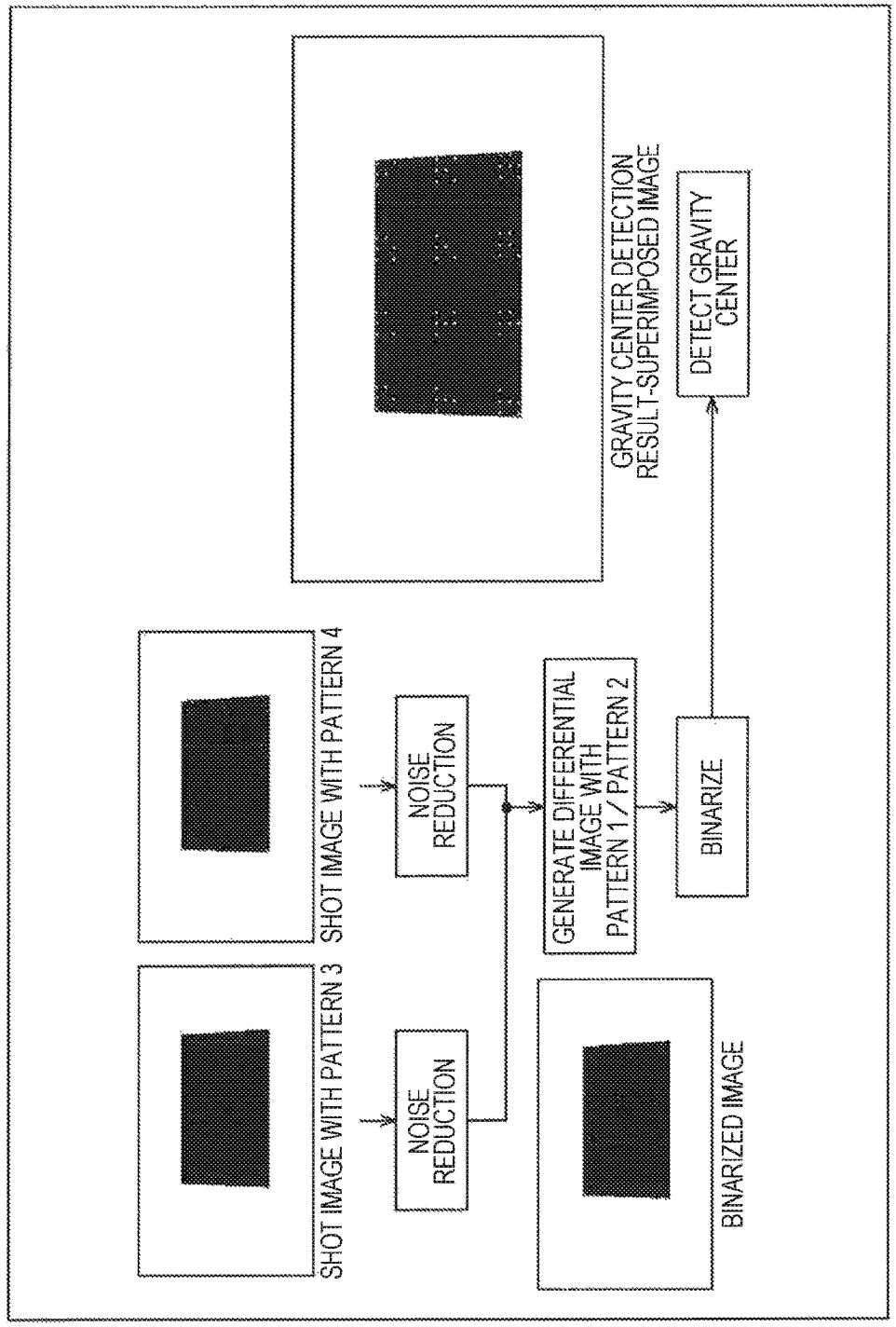
FIG. 23 is a diagram for explaining the gravity center detection processing by way of example.

When the gravity center detection processing is started, in step S201, the unique pattern shot image noise detection unit 251 performs the noise reduction processing on the black shot image (the shot image with pattern 3 in FIG. 23) and the unique pattern shot image (the shot image with pattern 4 in FIG. 23), respectively, as in the example illustrated in FIG. 23.

In step S202, the differential image generation unit 252 generates a differential image between the black shot image and the unique pattern shot image which are reduced in noise as in the example illustrated in FIG. 23. The differential image is also denoted as unique pattern differential image.

In step S203, the differential image binarization unit 253 binarizes the unique pattern differential image as in the example illustrated in FIG. 23. The binarized unique pattern differential image is also denoted as unique pattern binarized image.

In step S204, the binarized image's gravity center detection unit 254 performs the gravity center detection processing on the unique pattern binarized image thereby to find the gravity center coordinate of each sub-pattern in each unique pattern included in the unique pattern binarized image as in the example illustrated in FIG. 23.

When the processing in step S204 ends, the processing returns to FIG. 17.

As described above, the pattern 4 is an image in which the unique pattern is superimposed on the black image similar to the pattern 3, and thus the unique pattern differential image is reduced in effects of color of the screen 104 or external light. Therefore, the gravity center detection is performed by use of such a unique pattern differential image, thereby detecting the center of gravity of each sub-pattern more robustly (or enhancing robustness of the gravity center detection).

<Flow of Inter-Image Corresponding Point Detection Processing>

Figure 24:
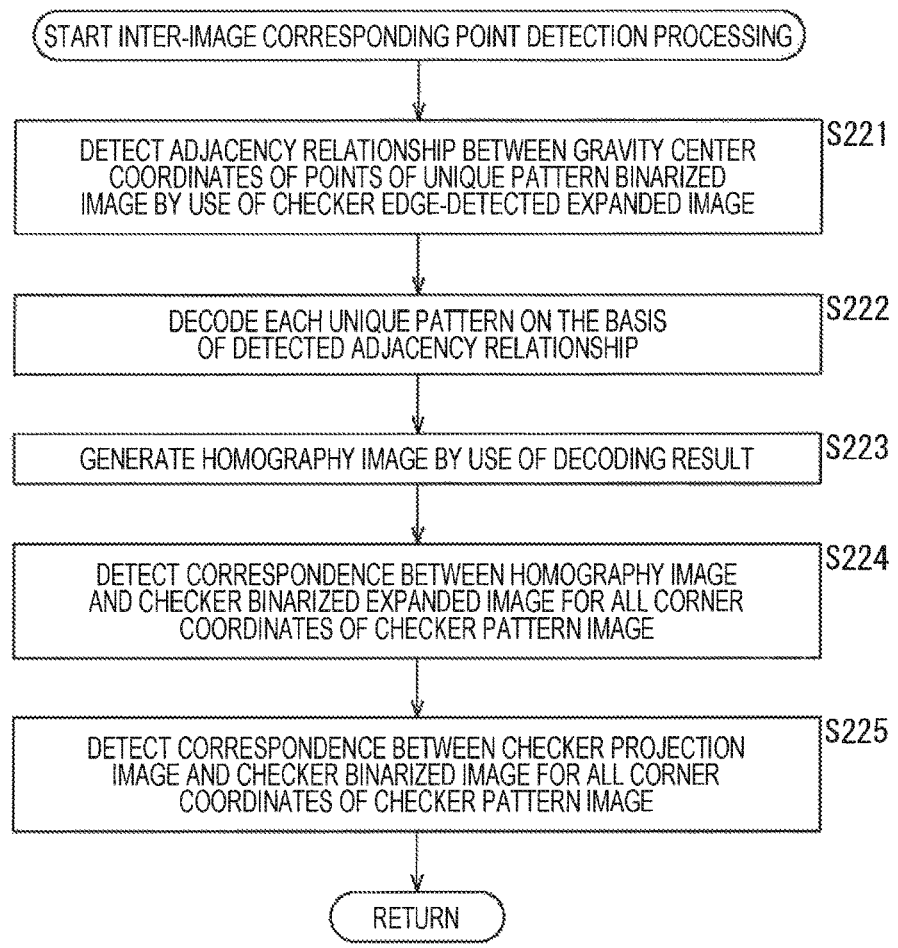
FIG. 24 is a flowchart for explaining an exemplary flow of an inter-image corresponding point detection processing.

An exemplary flow of the inter-image corresponding point detection processing performed in step S145 in FIG. 17 will be described below with reference to the flowchart of FIG. 24.

Figure 25:
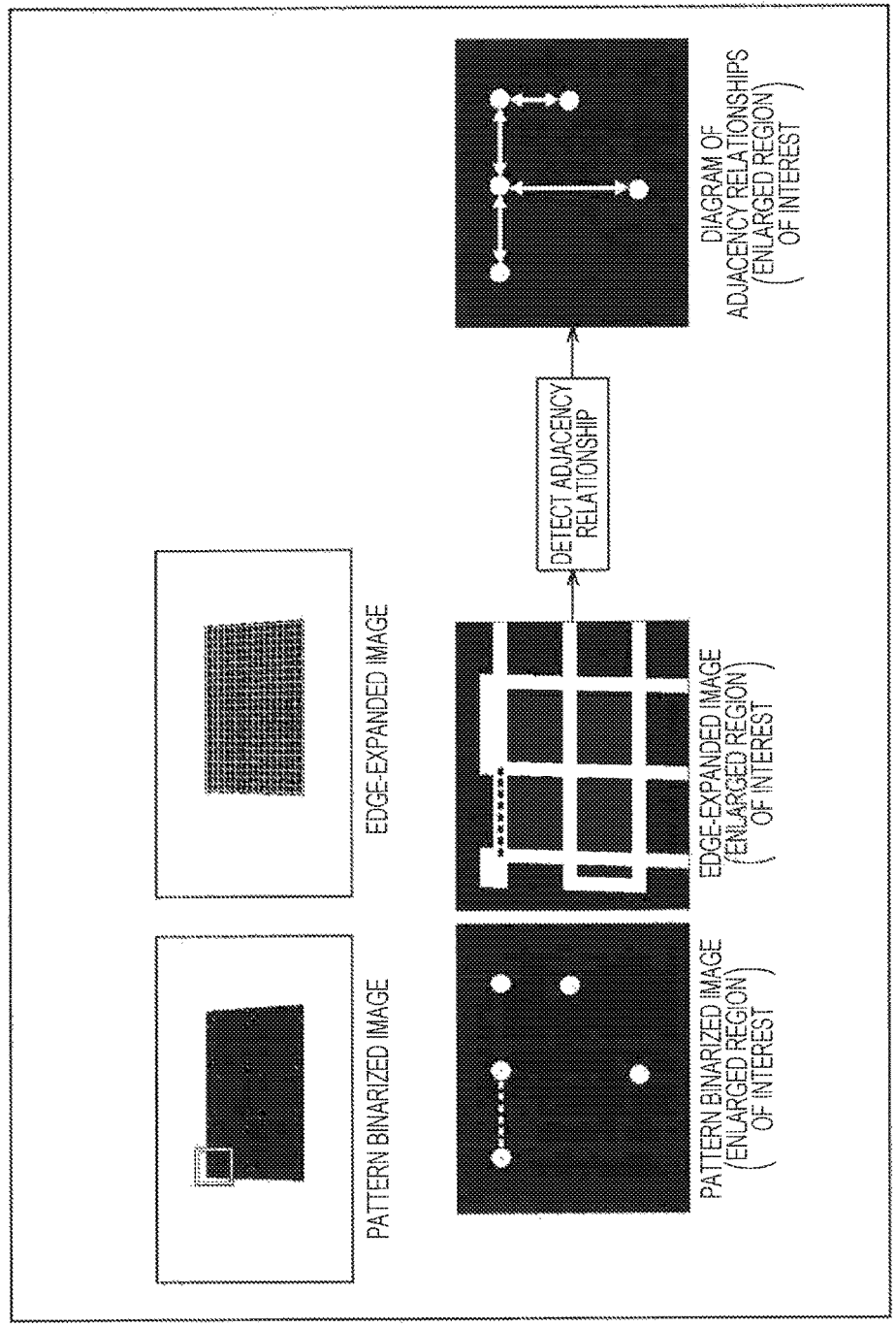
FIG. 25 is a diagram illustrating an adjacency relationship detection processing by way of example.

When the inter-image corresponding point detection processing is started, in step S221, the unique pattern adjacency relationship detection unit 261 detects an adjacency relationship between the gravity center coordinates of the sub-patterns of the unique pattern binarized image detected in the gravity center detection processing by use of the checker edge-detected expanded image generated in the edge detection processing as in the example illustrated in FIG. 25.

Focusing on a sub-pattern, if an adjacency relationship along an edge is assumed with reference to the pixel values of the checker edge-detected expanded image along the line connecting the points whose coordinates are close as in the example illustrated in FIG. 25, the pixel values should be 1. In terms of the fact, the pixel values of the checker edge-detected expanded image are incremented along the line connecting the sub-patterns, and if a rate of pixels whose pixel value is 1 relative to the reference point is at a threshold or more, any of upper, lower, right, and left adjacency relationships is assumed. Herein, the checker edge-detected expanded image is used in order to assume that oblique sub-patterns, which are not along an edge, are not in an adjacency relationship and to avoid erroneously decoding with a subsequent unique pattern.

When an adjacency relationship is detected, in step S222, the unique pattern decoding unit 262 decodes each unique pattern on the basis of the adjacency relationships detected in step S221.

Figure 26:
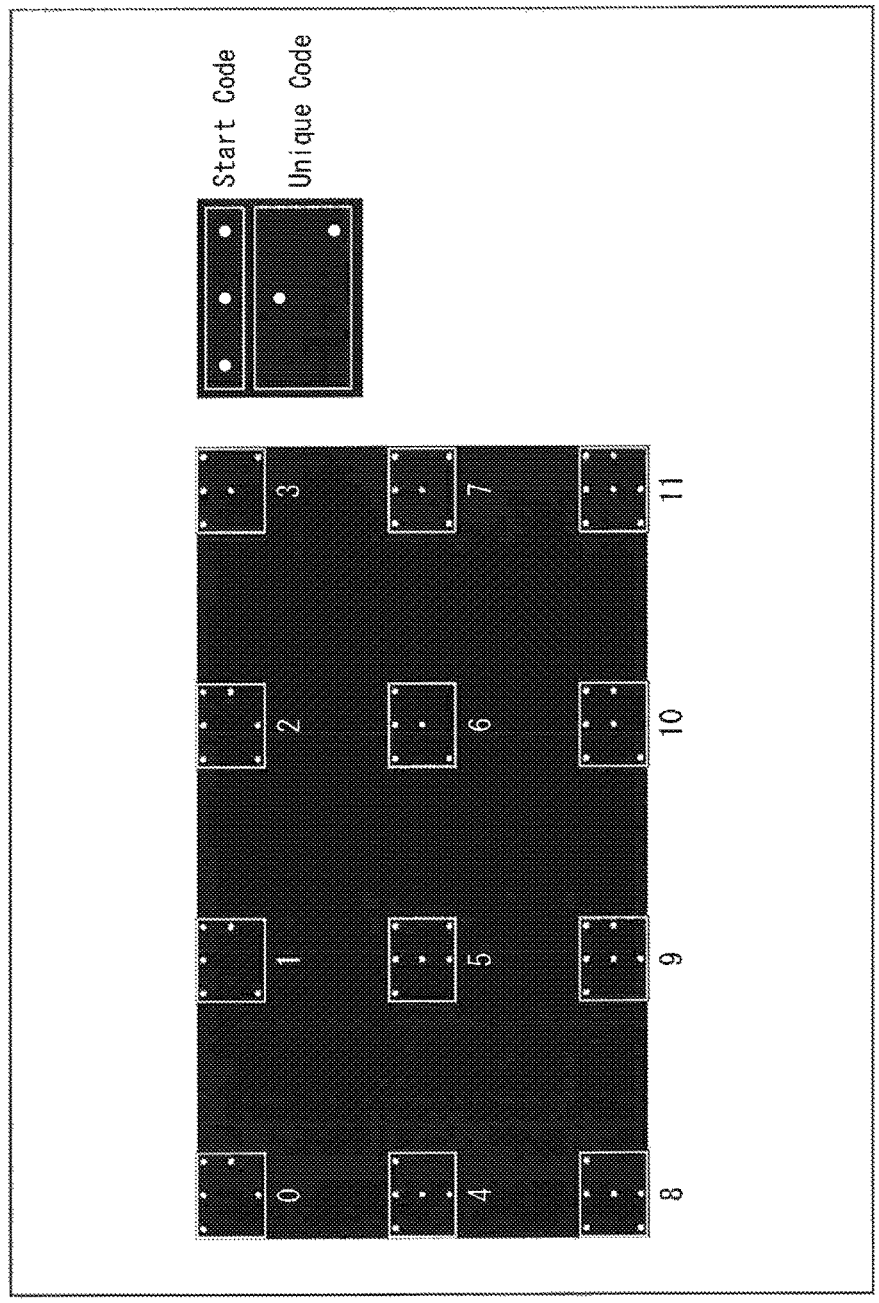
FIG. 26 is a diagram illustrating an exemplary configuration of unique patterns.

Exemplary unique patterns are illustrated in FIG. 26. As illustrated in FIG. 26, the unique patterns are used for indicating that three sub-patterns arranged in the horizontal direction (sub-patterns arranged in one row by three columns) are assumed as start code (StartCode) and a unique code (UniqueCode) is present below it. The unique code (UniqueCode) is a combination in which three sub-patterns are not arranged in the horizontal direction and which is present alone in the screen (sub-patterns arranged in two rows by three columns). The gravity center coordinates of the sub-patterns are the same as the corner coordinates of the checker, and thus the unique code (UniqueCode) is decoded thereby to refer to the checker corner coordinates corresponding to the positions of the patterns in the unique code (UniqueCode).

Of course, the unique patterns illustrated in FIG. 26 are exemplary, and the start code and the unique code of the unique pattern may be formed of any pattern. For example, a tighter correspondence can be acquired by increasing combinations of the unique codes (UniqueCode) such as assuming four sub-patterns in the horizontal directions or increasing the number of rows of sub-patterns. That is, the start code may be formed of a plurality of sub-patterns arranged as graphic, and any unique code, which is arranged as different graphic from other patterns, may be employed.

Figure 27:
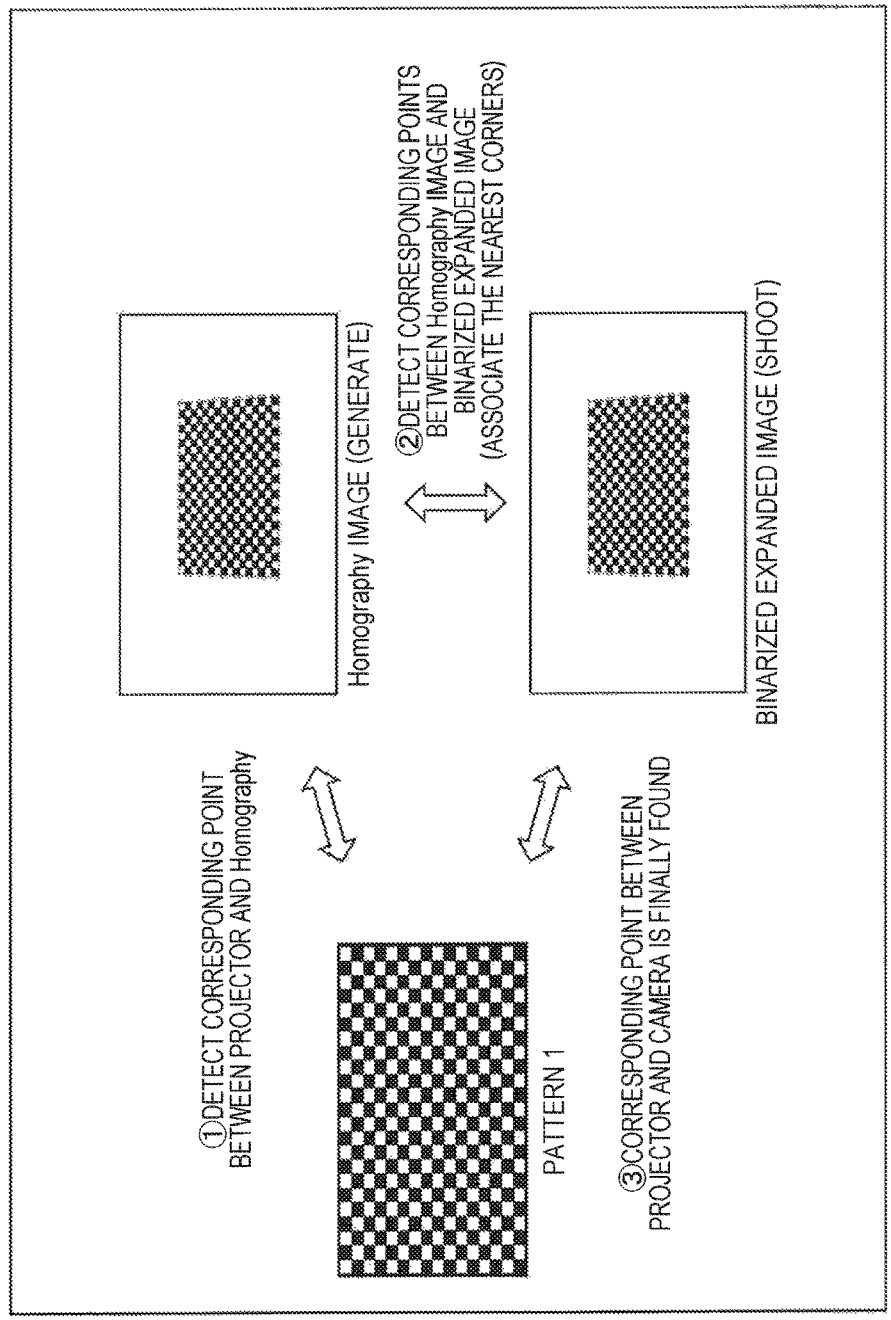
FIG. 27 is a diagram illustrating the inter-image corresponding point detection processing by way of example.

In step S223, the homography image generation unit 263 performs projection transformation on the checker projection image as in the example illustrated in FIG. 27 by use of the unique pattern decoding result acquired in step S222, thereby generating a homography image.

By use of the unique pattern decoding result, it is possible to acquire a correspondence between each corner coordinate of the checker in the checker projection image with pattern 1 and the gravity center coordinate of each pattern of the decoded unique pattern, for example. The homography image generation unit 263 finds a homography matrix by use of the correspondence thereby to generate a homography image of the checker projection image. That is, the homography image generation unit 263 finds the gravity center coordinate of the pattern in the homography image for all the corner coordinates of the checker with pattern 1 in the checker projection image. That is, the corresponding points between the projection image and its homography image are detected.

The homography image is not the same as the checker shot image (checker binarized expanded image).

Thus, in step S224, the homography image/shot image corresponding point detection unit 264 associates the nearest coordinates of the homography image and the checker binarized expanded image thereby to detect the corresponding points between the homography image and the checker binarized expanded image as in the example illustrated in FIG. 27.

Then in step S225, the projection image/shot image corresponding point detection unit 265 detects a correspondence between the checker projection image and the checker binarized expanded image (checker shot image) for all the corner coordinates of the checker image by use of the corresponding point detection results in step S223 and step S224. In this way, the corresponding coordinates between the projection image and the shot image can be found.

When the processing in step S225 ends, the inter-image corresponding point detection processing ends and the processing returns to FIG. 17.

Each processing is performed as described above so that the control device 101 can detect the corresponding points between the projection image and the shot image by use of four pattern images (two pattern images when background erase (differential image) is not conducted) less than in the method in Non-Patent Document 1. Thereby, it is possible to more easily find a relative posture between the projection unit and the shooting unit.

Further, the unique patterns are used as described above so that the corresponding points between the projection image and the shot image can be detected if any unique pattern can be detected, thereby further enhancing the degree of freedom in installation of the projection shooting devices 102 than in the method described in Non-Patent Document 1.

Further, a robust pattern is used against projection distortion of the projection units 302, and thus the control device 101 can acquire the corresponding points with higher accuracy. Furthermore, the control device 101 can robustly acquire a unique pattern by use of the characteristic amount acquired from the projection pattern.

<Exemplary Configuration of Projection Shooting System>

Figure 28:
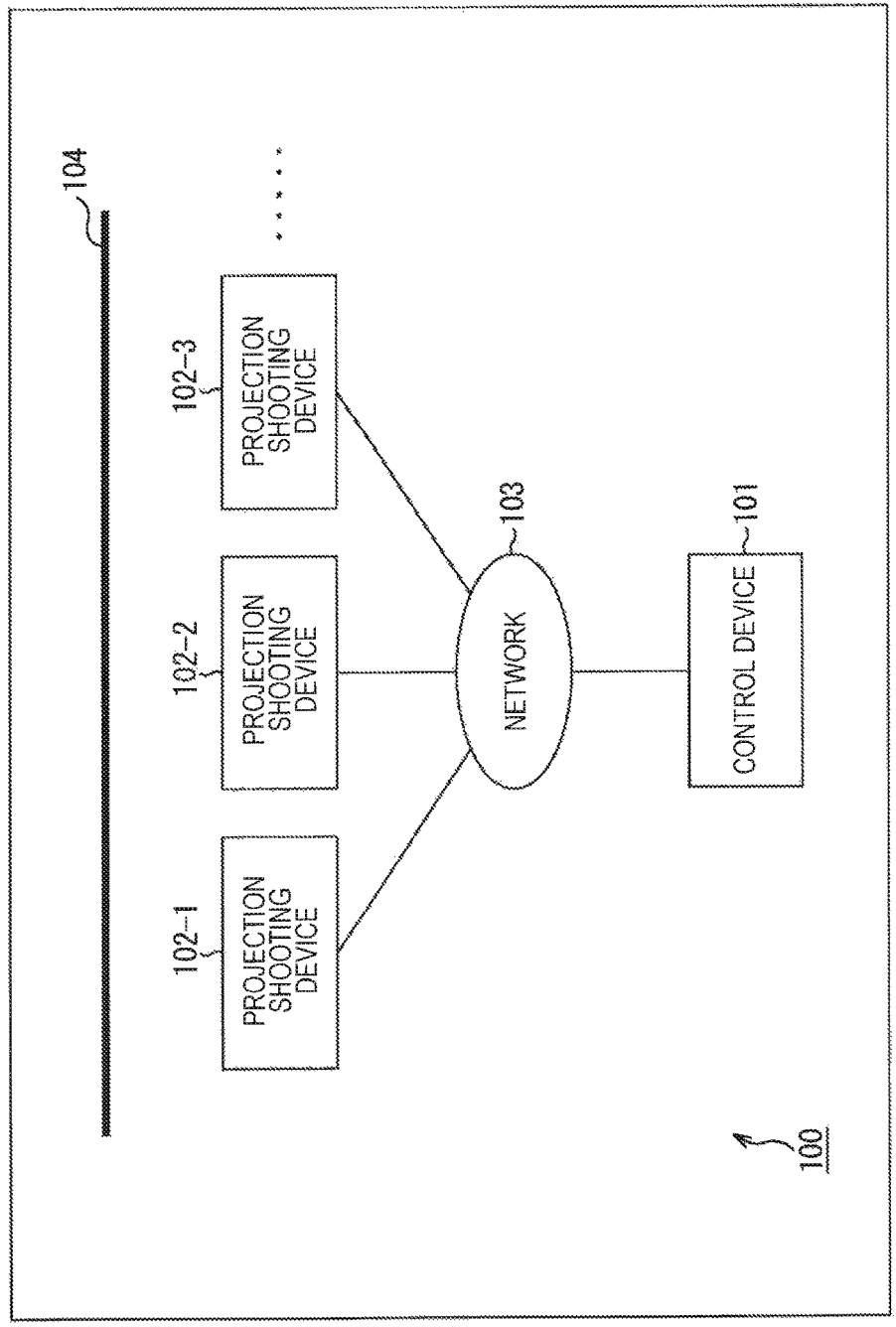
FIG. 28 is a diagram illustrating other exemplary configuration of the projection shooting system.

The description has been made above assuming that the projection shooting system 100 has two projection shooting devices 102, but the number of projection shooting devices 102 configuring the projection shooting system 100 may be three or more (the projection shooting device 102-1, the projection shooting device 102-2, the projection shooting device 102-3, . . . ) as in the example illustrated in FIG. 28, for example.

Figure 29:
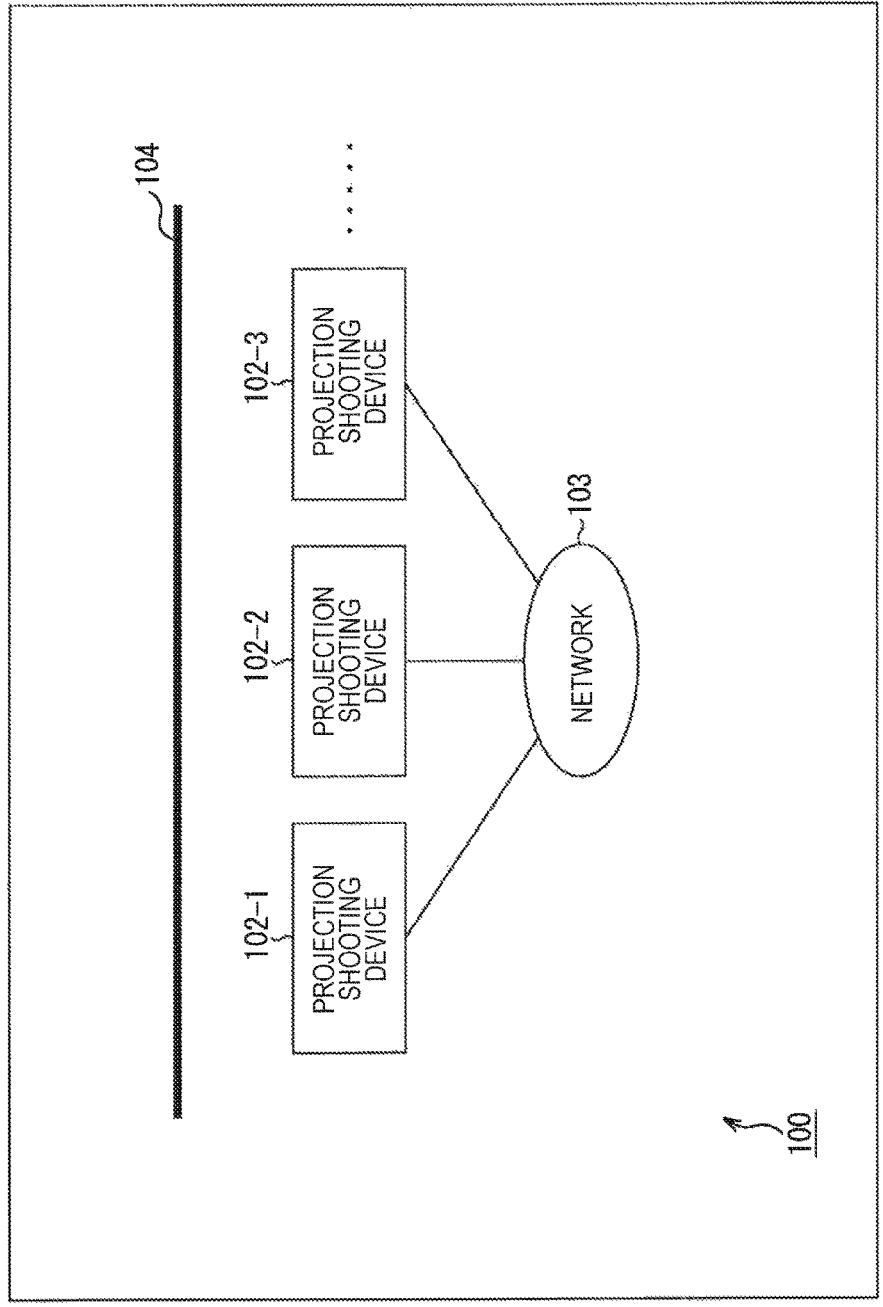
FIG. 29 is a diagram illustrating still other exemplary configuration of the projection shooting system.

Further, part or all of the correspondence detection processing described above may be performed outside the control device 101. For example, as in the example illustrated in FIG. 29, the control device 101 may be omitted from the projection shooting system 100 and the correspondence detection processing may be performed in any of the projection shooting devices 102. Further, the projection shooting devices 102 may cooperate to divide and perform each processing in the correspondence detection processing described above.

Figure 30:
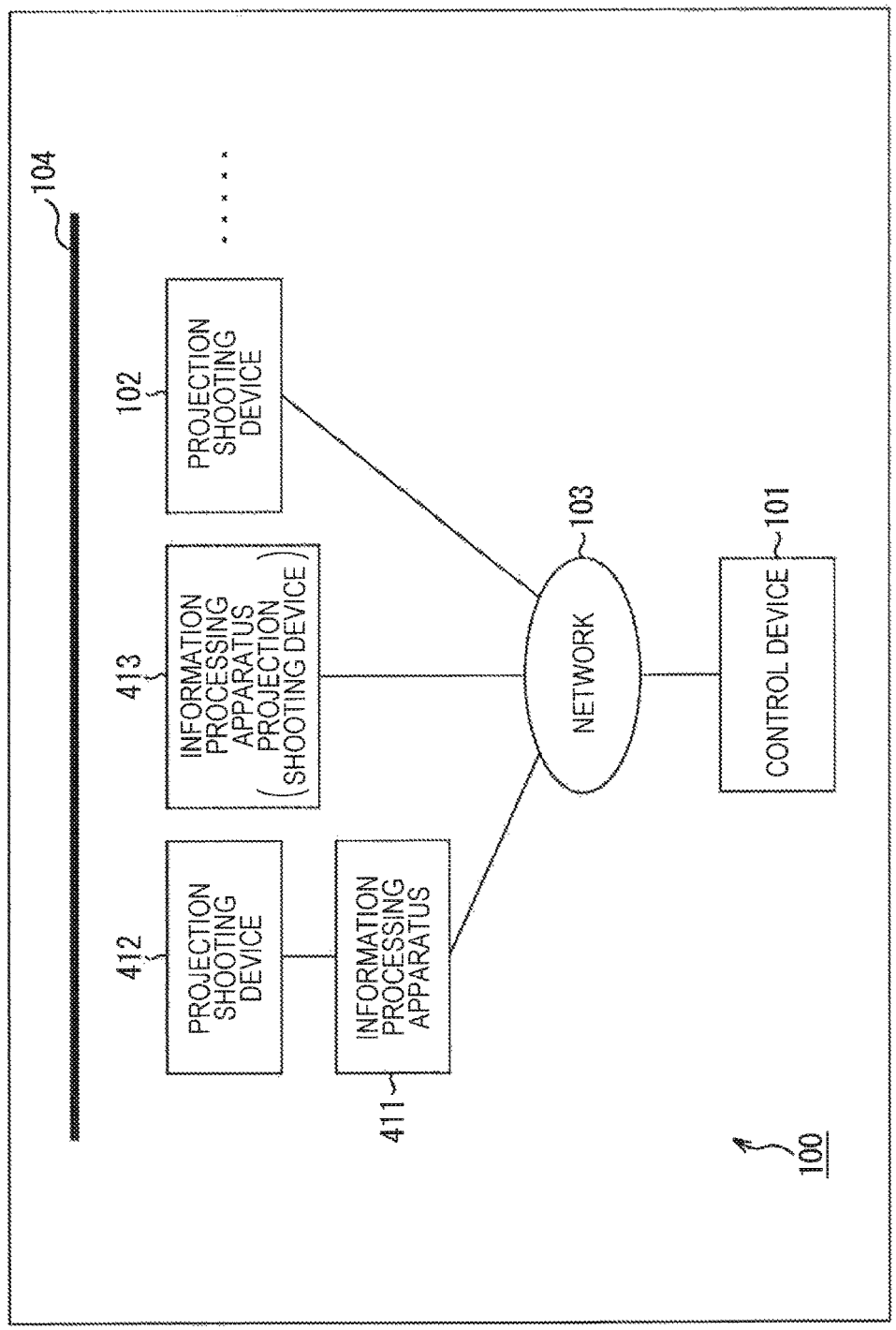
FIG. 30 is a diagram illustrating still other exemplary configuration of the projection shooting system.

Further, the projection shooting devices may be connected to the network 103 (such as the control device 101 or other projection shooting devices 103) via other information processing apparatus 411 like a projection shooting device 412 illustrated in FIG. 30. The projection shooting device 412 is a similar device to the projection shooting devices 102 described above. Additionally, the projection shooting device is connected to the network 103 via the information processing apparatus 411 having a communication function such as cell phone, Smartphone, tablet computer, or notebook type computer. Further, the projection shooting device 412 is driven under control of the information processing apparatus 411. By doing so, the information processing apparatus 411 with high processing capability can be caused to perform a communication processing or processing of controlling projection or shooting, thereby restricting an increase in the functions (such as information processing capability) required for the projection shooting device 412 and restricting an increase in cost.

Further, the functions of the projection shooting device 102 described above may be realized as modules (or parts). The information processing apparatus 413 in FIG. 30 is an information processing apparatus with high processing capability such as cell phone, Smartphone, tablet computer or notebook type computer, and incorporates therein the modules having the functions of the projection shooting device 102 described above. That is, the information processing apparatus 413 is an apparatus having the functions of both the information processing apparatus 411 and the projection shooting device 412. The projection shooting device 102 can be realized as such an image processing apparatus.

Further, as in the example illustrated in FIG. 30, devices having mutually-different functions may be present together as the projection shooting devices 102.

Figure 31:
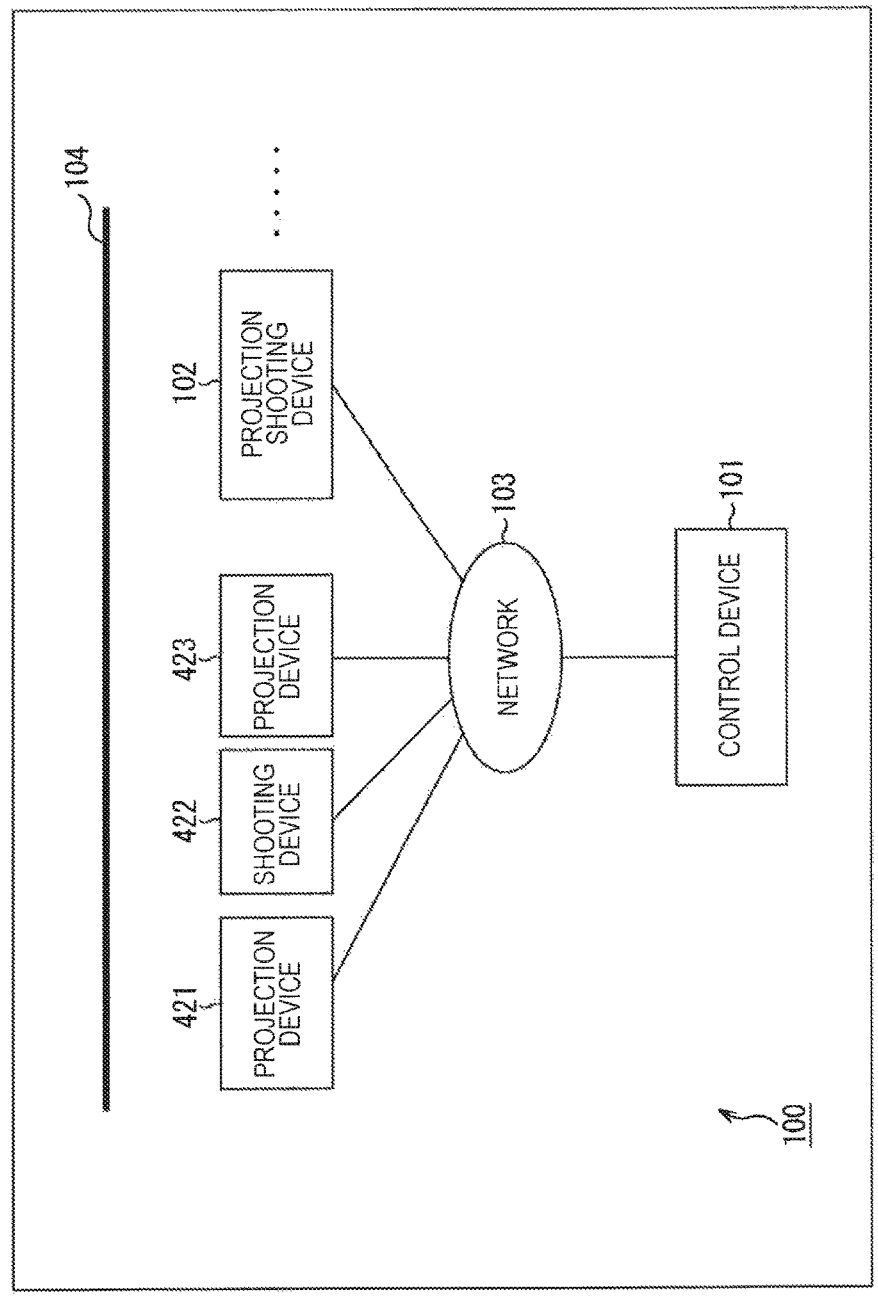
FIG. 31 is a diagram illustrating still other exemplary configuration of the projection shooting system.

Further, as in the example illustrated in FIG. 31, the projection shooting system 100 may include a projection device 421 having only the projection unit 302, a shooting device 422 having only the shooting unit 303, or the like. Further, a plurality of projection units 302 or shooting units 303 may be provided in one device. Further, the number of projection units 302 may not match with the number of shooting units 303 in the entire projection shooting system 100.

A series of processing described above may be performed in hardware or in software. When the series of processing is performed in software, the programs configuring the software are installed from a network or recording medium.

The recording medium is configured of the removable medium 171 or the removable medium 321 recording therein the programs, which is distributed for distributing the programs to the user, separately from the device main body as illustrated in FIG. 8 or FIG. 11, for example. The removable medium 171 or the removable medium 321 may be a magnetic disc (including flexible disc) or optical disc (including CD-ROM or DVD). Further, they may be a magnetooptical disc (including mini disc (MD)), semiconductor memory, or the like.

In this case, in the control device 101, for example, the removable medium 171 is mounted on the drive 165 so that the programs can be installed in the storage unit 163. Further, in the projection shooting device 102, for example, the removable medium 321 is mounted on the drive 315 so that the programs can be installed in the storage unit 313.

Further, the programs can be provided via a wired or wireless transmission medium such as local area network, Internet, or digital satellite broadcasting. In this case, in the control device 101, for example, the programs can be received by the communication unit 164 and installed in the storage unit 163. Further, in the projection shooting device 102, for example, the programs can be received by the communication unit 314 and installed in the storage unit 313.

Additionally, the programs can be previously installed in a storage unit, ROM, or the like. For example, in the control device 101, the programs can be previously installed in the storage unit 163, the ROM 153, or the like. Further, in the projection shooting device 102, for example, the programs can be previously installed in the storage unit 313, the ROM in the control unit 301, or the like.

Additionally, the programs executed by a computer may be such that the series of processing is performed in time series in the order described in the specification or the series of processing is performed in parallel or at necessary timings such as on calling.

Further, in the specification, the steps describing the programs recorded in a recording medium may be such that the series of processing is performed in time series in the described order or the series of processing is performed in parallel or independently though not being necessarily performed in time series.

Further, the processing in each step described above can be performed in each device described above or any device other than the devices described above. In this case, a device for performing the processing may have a function (such as functional block) required for performing the function. Further, information required for the processing may be transmitted to the device as needed.

Furthermore, in the specification, a system indicates a set of components (such as devices or modules (parts)), and all the components may not be necessarily incorporated in the same casing. Thus, the system may be a plurality of devices housed in separate casings and connected via a network or one apparatus in which a plurality of modules are housed in one casing.

Further, as described above, a configuration described as one apparatus (or processing unit) may be divided to be a plurality of devices (or processing units). To the contrary, a configuration described above as a plurality of devices (processing units) may be configured as one apparatus (or processing unit). Further, the configuration of each apparatus (or processing unit) may be added with a configuration other than those described above. Furthermore, if the configurations or operations in the entire system are substantially the same, part of the configuration of an apparatus (or processing unit) may be included in the configuration of other apparatus (or other processing unit).

The preferred exemplary embodiment of the present disclosure has been described above in detail with reference to the accompanying drawings, but the technical scope of the present disclosure is not limited thereto. Those skilled in the art in the technical field of the present disclosure can understand that various changes and modifications can be made in the technical scope described in CLAIMS and of course they fall within the technical scope of the present disclosure.

For example, the present technology may employ a cloud computing configuration in which one function is divided and processed in a plurality of devices via a network.

Further, each step described in the flowcharts described above can be divided and performed in a plurality of devices not only being performed in one apparatus.

Further, when a series of processing is included in one step, the series of processing included in one step can be divided and performed in a plurality of devices not only being performed in one apparatus.

Further, the present technology can be accomplished as any apparatus or component mounted on an apparatus configuring a system, such as processor as system large scale integration (LSI), module using a plurality of processors, unit using a plurality of modules, or unit added with other functions (or configuration of part of an apparatus).

Additionally, the present technology may employ the following configurations.

(1) An image processing apparatus including:
a detection unit for detecting a correspondence between a projection image and a shot image of the projection image by use of a pattern shot image which is a shot image of a pattern projection image as a projection image of an image including a pattern.

(2) The image processing apparatus according to (1),
wherein the image includes a plurality of patterns, and
each pattern is configured of a plurality of sub-patterns and is different from other patterns in the number of sub-patterns or positional relationships between the sub-patterns.

(3) The image processing apparatus according to (2),
wherein the pattern has:
a start coder in which the sub-patterns are arranged in common number and positional relationship in each pattern; and
a unique code in which the number or positional relationship of the sub-patterns is different from other patterns.

(4) The image processing apparatus according to (3),
wherein the start code is configured of a plurality of sub-patterns arranged as a graphic, and
the unique code is arranged in a different graphic from other patterns.

(5) The image processing apparatus according to (3),
wherein the start code is configured of three patterns arranged in one row by three columns, and
the unique code is configured of a single or a plurality of sub-patterns arranged in different number or positional relationship from the other patterns within two rows by three columns.

(6) The image processing apparatus according to (2) to (5),
wherein the sub-patterns are arranged in a dotted graphic.

(7) The image processing apparatus according to any of (2) to (6),
wherein the detection unit detects corresponding points between a projection image and a shot image of the projection image by use of the number and positional relationship of the sub-patterns for each pattern included in the pattern shot image, thereby detecting the correspondence.

(8) The image processing apparatus according to (7),
wherein the detection unit analyzes the number and positional relationship of the sub-patterns by use of the adjacency relationships between the patterns for each pattern, thereby detecting the corresponding points.

(9) The image processing apparatus according to (8),
wherein the detection unit detects an adjacency relationship between the sub-patterns by use of an edge image indicating edges of a pattern in a shot image of a projection image of an image with the predetermined pattern.
(10) The image processing apparatus according to (9), further including:
an edge detection unit for detecting edges of the pattern in the shot image of the projection image of the image with the predetermined pattern thereby to generate the edge image,
wherein the detection unit detects an adjacency relationship between the sub-patterns by use of the edge image generated by the edge detection unit.
(11) The image processing apparatus according to (10),
wherein the detection unit detects an adjacency relationship between the sub-patterns by use of the edge-expanded edge image.
(12) The image processing apparatus according to any of (8) to (11),
wherein the detection unit detects an adjacency relationship between the sub-patterns by use of the centers of gravity of the sub-patterns for each pattern included in the pattern shot image.
(13) The image processing apparatus according to (12),
wherein the detection unit detects the centers of gravity of the sub-patterns by use of the binarized pattern shot image.
(14) The image processing apparatus according to any of (1) to (13),
wherein the detection unit detects corresponding points between the projection image and the shot image by use of corresponding points between a homography image generated on the basis of the patterns included in the pattern shot image and a shot image of the projection image.
(15) The image processing apparatus according to (14),
wherein the image with the predetermined pattern is a checked image.
(16) The image processing apparatus according to (14) or (15),
wherein the detection unit detects corresponding points between the homography image and the shot image for all the corners of the predetermined pattern in the shot image, and detects corresponding points between the projection image and the shot image for all the detected corners of the predetermined pattern.
(17) The image processing apparatus according to (16),
wherein the detection unit detects the corners by use of an image in which the shot image is binarized to expand a predetermined component.
(18) The image processing apparatus according to any of (1) to (17), further including:
a shooting unit for shooting a projection image and acquiring a shot image,
wherein the detection unit detects corresponding points between a projection image and the shot image acquired by shooting the projection image by the shooting unit by use of the pattern shot image acquired by shooting the pattern projection image by the shooting unit, thereby detecting the correspondence.
(19) The image processing apparatus according to any of (1) to (18), further including:
a projection unit for projecting an image,
wherein the detection unit detects corresponding points between a projection image projected by the projection unit and a shot image of the projection image by use of a pattern shot image as a shot image of the pattern projection image projected by the projection unit, thereby detecting the correspondence.
(20) The image processing apparatus according to any of (1) to (19), further including:
an image processing unit for performing an image processing on apart of an image to be projected, which overlaps on other projection image, by use of the correspondence between the projection image and the shot image detected by the detection unit.
(21) An image processing method for detecting a correspondence between a projection image and a shot image of the projection image by use of a pattern shot image which is a shot image of a pattern projection image as a projection image of an image including a pattern.

REFERENCE SIGNS LIST

100 Projection shooting system
101 Control device
102 Projection shooting device
103 Network
104 Screen
111 and 112 Projection image
113 Overlap region
151 CPU
201 Correspondence detection unit
202 Projection control unit
203 Shooting control unit
211 Pattern image projection shooting processing unit
212 Corresponding point detection processing unit
213 Projection image processing unit
221 Corner detection processing unit
222 Edge detection processing unit
223 Gravity center detection processing unit
224 Inter-image corresponding point detection processing unit
231 Shot image noise reduction unit
232 Differential image generation unit
233 Differential image binarization unit
234 Binarized image expansion unit
235 Binarized expanded image's corner detection unit
241 Binarized expanded image's edge detection unit
242 Edge-detected image generation unit
243 Edge-detected image expansion unit
251 Unique pattern shot image noise reduction unit
252 Differential image generation unit
253 Differential image binarization unit
254 Binarized image's gravity center detection unit
261 Unique pattern adjacency relationship detection unit
262 Unique pattern decoding unit
263 Homography image generation unit
264 Homography image/shot image corresponding point detection unit
265 Projection image/shot image corresponding point detection unit
301 Control unit
302 Projection unit
303 Shooting unit
351 Video processor
352 Laser driver
353 Laser output unit
354 Mirror
355 MEMS driver
356 MEMS mirror
411 Information processing apparatus
412 Projection shooting device
413 Information processing apparatus
421 Projection device
422 Shooting device
423 Projection device

The invention claimed is:

1. An image processing apparatus comprising:
a detection unit configured to detect a correspondence between a projection image and a shot image of the projection image by use of a pattern shot image which is a shot image of a pattern projection image as a projection image of a pattern image,
wherein the pattern image includes a plurality of patterns spatially,
wherein each pattern of the plurality of patterns is configured of a plurality of sub-patterns and is different from other patterns of the plurality of patterns,
wherein each pattern has a start code configured of sub-patterns arranged in one row and a unique code configured of sub-patterns arranged in two rows, and
wherein the detection unit is implemented via at least one processor.

2. The image processing apparatus according to claim 1,
wherein each pattern is different from the other patterns of the plurality of patterns in a number of sub-patterns or positional relationships between the sub-patterns.

3. The image processing apparatus according to claim 2, wherein each pattern has:
the start code in which the plurality of sub-patterns are arranged in common number and positional relationship in each pattern; and
the unique code in which the number or positional relationship of the sub-patterns is different from the other patterns.

4. The image processing apparatus according to claim 3,
wherein the start code of each pattern is configured of the plurality of sub-patterns arranged as a graphic, and
wherein the unique code of each pattern is arranged in a different graphic from each of the other patterns.

5. The image processing apparatus according to claim 3,
wherein the start code of each pattern is configured of three sub-patterns arranged in one row by three columns, and
wherein the unique code of each pattern is configured of a single or a plurality of sub-patterns arranged in different number or positional relationship from the other patterns within two rows by three columns.

6. The image processing apparatus according to claim 2,
wherein the plurality of sub-patterns are arranged in a dotted graphic.

7. The image processing apparatus according to claim 2,
wherein the detection unit detects corresponding points between a projection image and a shot image of the projection image by use of the number and positional relationship of the sub-patterns for each pattern included in the pattern shot image, thereby detecting the correspondence.

8. The image processing apparatus according to claim 7,
wherein the detection unit analyzes the number and positional relationship of the sub-patterns by use of adjacency relationships between the patterns for each pattern, thereby detecting the corresponding points.

9. The image processing apparatus according to claim 8,
wherein the detection unit detects an adjacency relationship between the sub-patterns by use of an edge image indicating edges of a pattern in a shot image of a projection image of an image with the predetermined pattern.

10. The image processing apparatus according to claim 9, further comprising:
an edge detection unit configured to detect edges of the pattern in the shot image of the projection image of the image with the predetermined pattern thereby to generate the edge image,
wherein the detection unit detects an adjacency relationship between the sub-patterns by use of the edge image generated by the edge detection unit, and
wherein the edge detection unit is implemented via at least one processor.

11. The image processing apparatus according to claim 10,
wherein the detection unit detects the adjacency relationship between the sub-patterns by use of an edge-expanded edge image.

12. The image processing apparatus according to claim 8,
wherein the detection unit detects an adjacency relationship between the adjacent sub-patterns by use of centers of gravity of the sub-patterns for each pattern included in the pattern shot image.

13. The image processing apparatus according to claim 12,
wherein the detection unit detects the centers of gravity of the sub-patterns by use of a binarized pattern shot image.

14. The image processing apparatus according to claim 1,
wherein the detection unit detects corresponding points between the projection image and the shot image by use of corresponding points between a homography image generated on the basis of the patterns included in the pattern shot image and a shot image of the projection image.

15. The image processing apparatus according to claim 14,
wherein the homography image comprises a checkered image.

16. The image processing apparatus according to claim 14,
wherein the detection unit detects corresponding points between the homography image and the shot image for all the corners of the predetermined pattern in the shot image, and detects corresponding points between the projection image and the shot image for all the detected corners of the predetermined pattern.

17. The image processing apparatus according to claim 16,
wherein the detection unit detects the corners by use of an image in which the shot image is binarized to expand a predetermined component.

18. The image processing apparatus according to claim 1, further comprising:
a shooting unit for shooting a projection image and acquiring a shot image,
wherein the detection unit detects corresponding points between a projection image and the shot image acquired by shooting the projection image by the shooting unit by use of the pattern shot image acquired by shooting the pattern projection image by the shooting unit, thereby detecting the correspondence.

19. The image processing apparatus according to claim 1, further comprising:
a projection device for projecting an image,
wherein the detection unit detects corresponding points between a projection image projected by the projection unit and a shot image of the projection image by use of a pattern shot image as a shot image of the pattern projection image projected by the projection unit, thereby detecting the correspondence.

20. The image processing apparatus according to claim 1, further comprising:
  an image processing unit for performing an image processing on a part of an image to be projected, which overlaps on other projection image, by use of the correspondence between the projection image and the shot image detected by the detection unit,
  wherein the image processing unit is implemented via at least one processor.

21. An image processing method, implemented via at least one processor, the method comprising:
  detecting a correspondence between a projection image and a shot image of the projection image by use of a pattern shot image which is a shot image of a pattern projection image as a projection image of a pattern image,
  wherein the pattern image includes a plurality of patterns spatially,
  wherein each pattern of the plurality of patterns is configured of a plurality of sub-patterns and is different from other patterns of the plurality of patterns, and
  wherein each pattern has a start code configured of sub-patterns arranged in one row and a unique code configured of sub-patterns arranged in two rows.

22. The image processing apparatus according to claim 1, wherein each pattern has the two rows of the unique code below the one row of the start code.

* * * * *